United States Patent
Kodama

[11] Patent Number: 5,917,460
[45] Date of Patent: Jun. 29, 1999

[54] HEAD-MOUNTED TYPE IMAGE DISPLAY SYSTEM

[75] Inventor: Hiroshi Kodama, Hachioji, Japan

[73] Assignee: Olympus Optical Company, Ltd., Tokyo, Japan

[21] Appl. No.: 08/498,392

[22] Filed: Jul. 5, 1995

[30] Foreign Application Priority Data

Jul. 6, 1994 [JP] Japan .................................. 6-154892

[51] Int. Cl.⁶ .................................................. G09G 5/00
[52] U.S. Cl. .................................................. 345/8; 345/7
[58] Field of Search .............................. 345/7, 8, 9, 121, 345/123, 126, 127; 359/630, 631, 632, 633, 634, 629

[56] References Cited

U.S. PATENT DOCUMENTS

| 5,091,719 | 2/1992 | Beamon, II | 345/8 |
| 5,093,567 | 3/1992 | Staveley | 345/8 |
| 5,422,653 | 6/1995 | Maguire, Jr. | 345/9 |
| 5,491,492 | 2/1996 | Knapp et al. | 345/8 |
| 5,515,070 | 5/1996 | Kawada | 345/8 |
| 5,539,578 | 7/1996 | Togino et al. | 345/8 |
| 5,579,026 | 11/1996 | Tabata | 345/8 |

*Primary Examiner*—Chanh Nguyen
*Assistant Examiner*—Xu-Ming Wu
*Attorney, Agent, or Firm*—Stevens, Davis, Miller & Mosher, L.L.P.

[57] ABSTRACT

A head-mounted type image display system includes right and left image display devices, first and second projection optical systems projecting right and left images displayed on the first and second image display devices onto right and and left eyes of a user as virtual images, a movement detection device for detecting a direction and an amount of up and down or right and left or back and forth movement of the user's head to derive a displacement signal, and a driving device responding to the displacement signal to move the first and second image display devices in a direction opposite to the detected direction of the movement of the user's head by an amount which is 0.8 times to 1.2 times of the detected amount of the movement of the user's head such that virtual images can be perceived by the user to be remained substantially stationary within the space.

15 Claims, 12 Drawing Sheets

FIG_1A
PRIOR ART
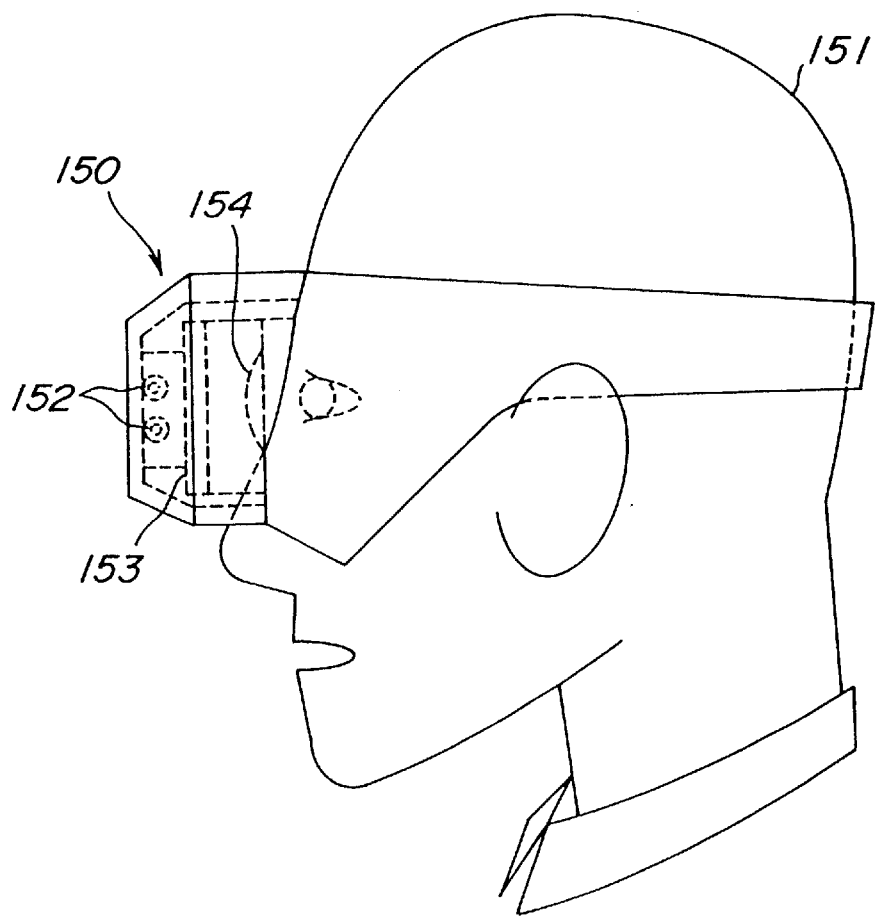
FIG_1B
PRIOR ART
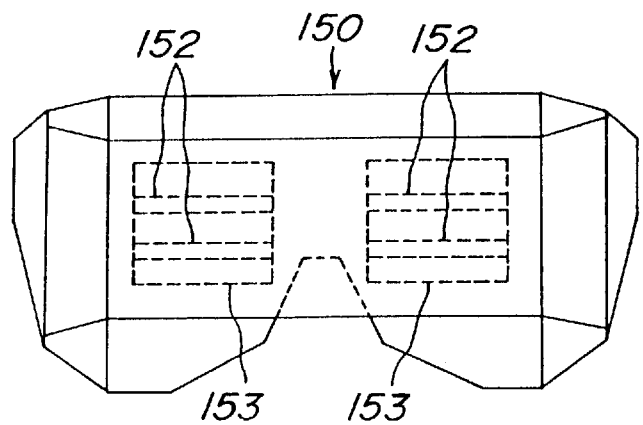

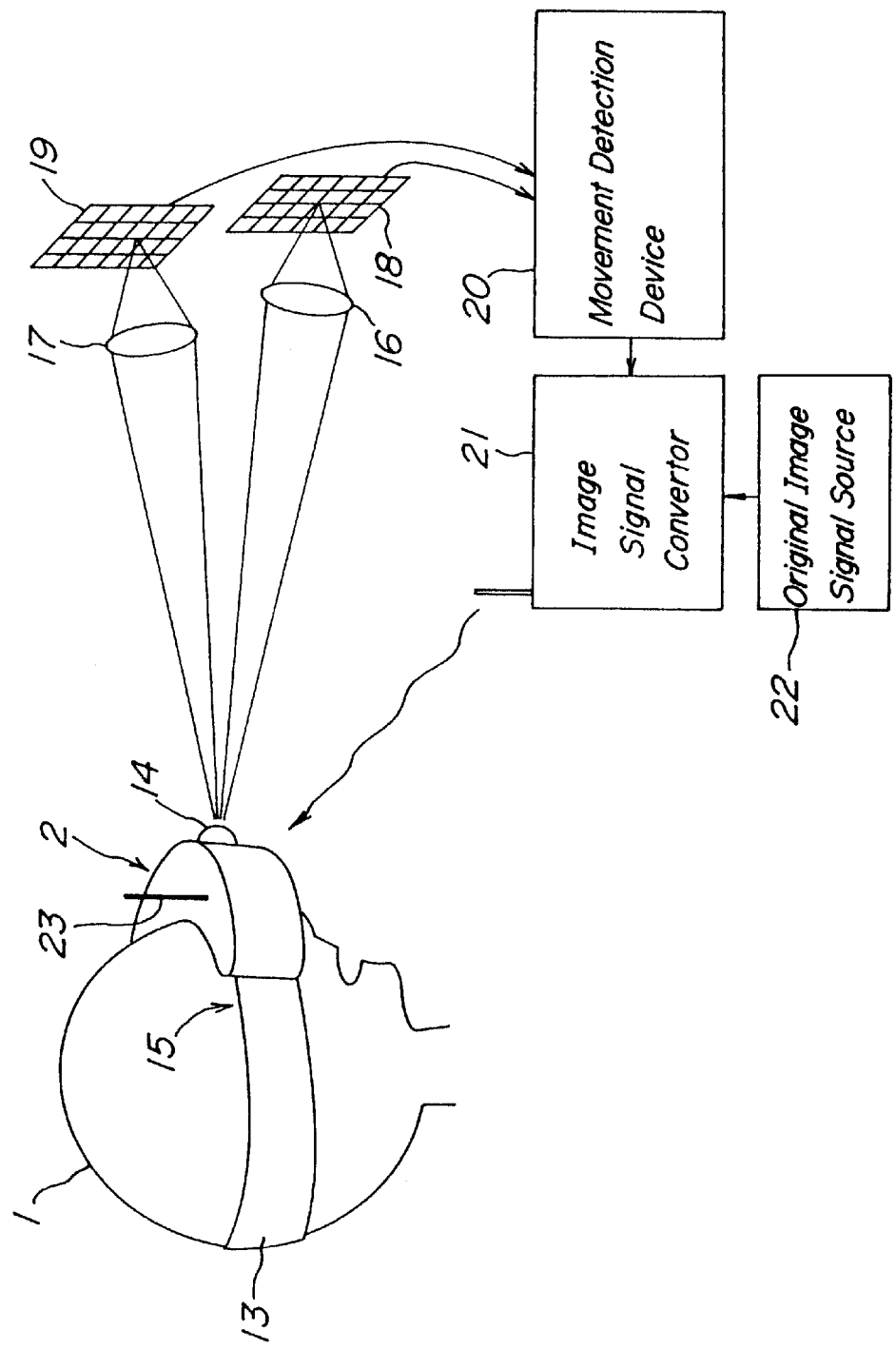

FIG_3
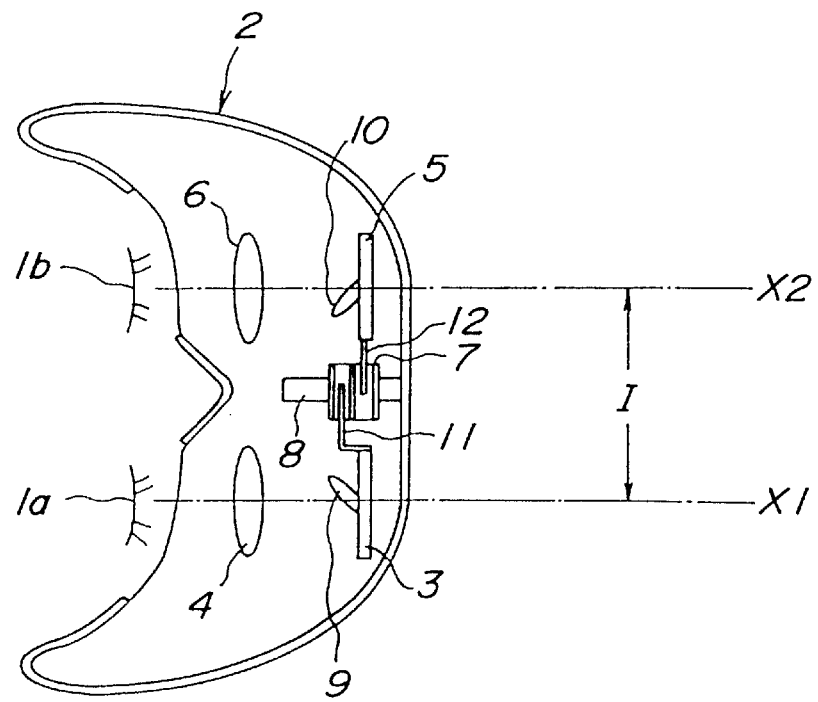
FIG_4
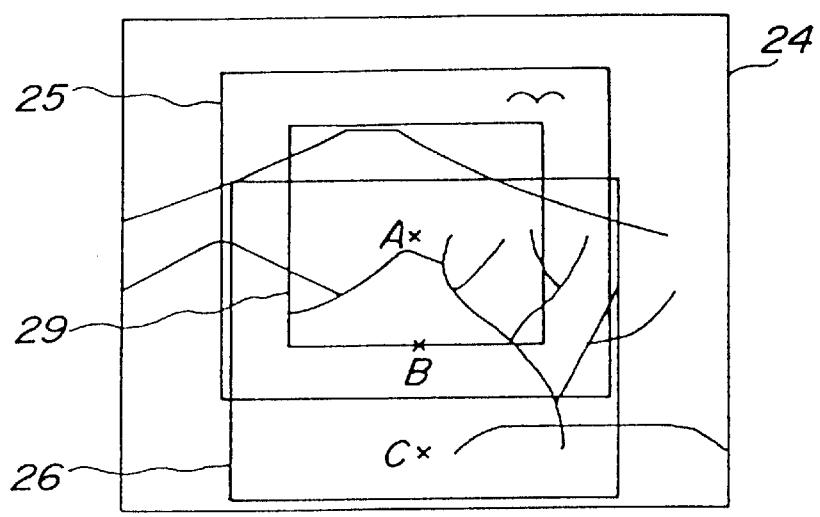

FIG_7
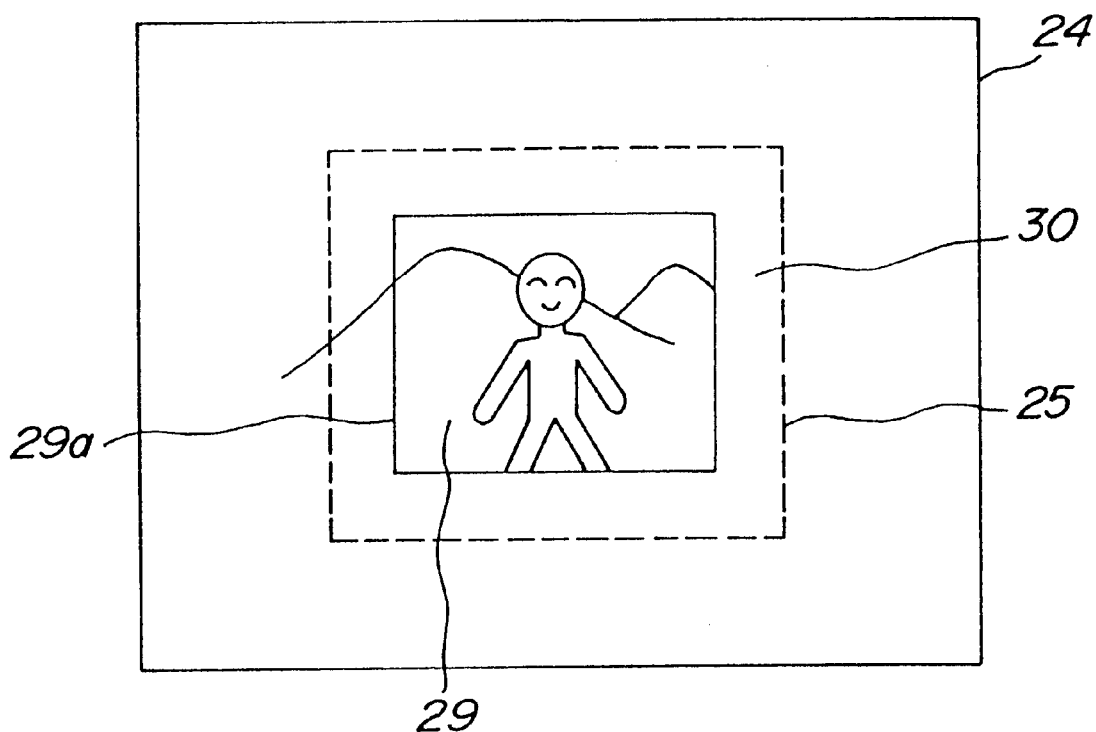

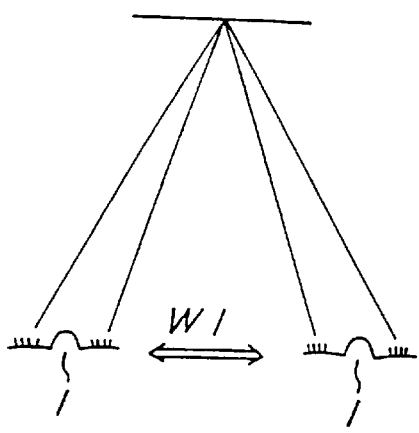
FIG_8A
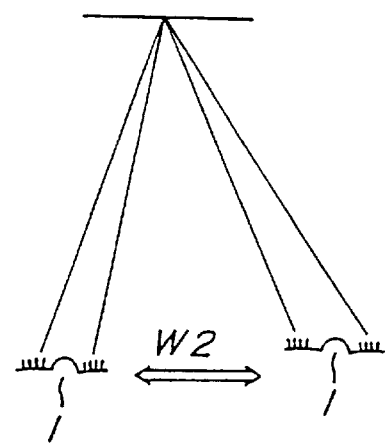
FIG_8B

FIG_10
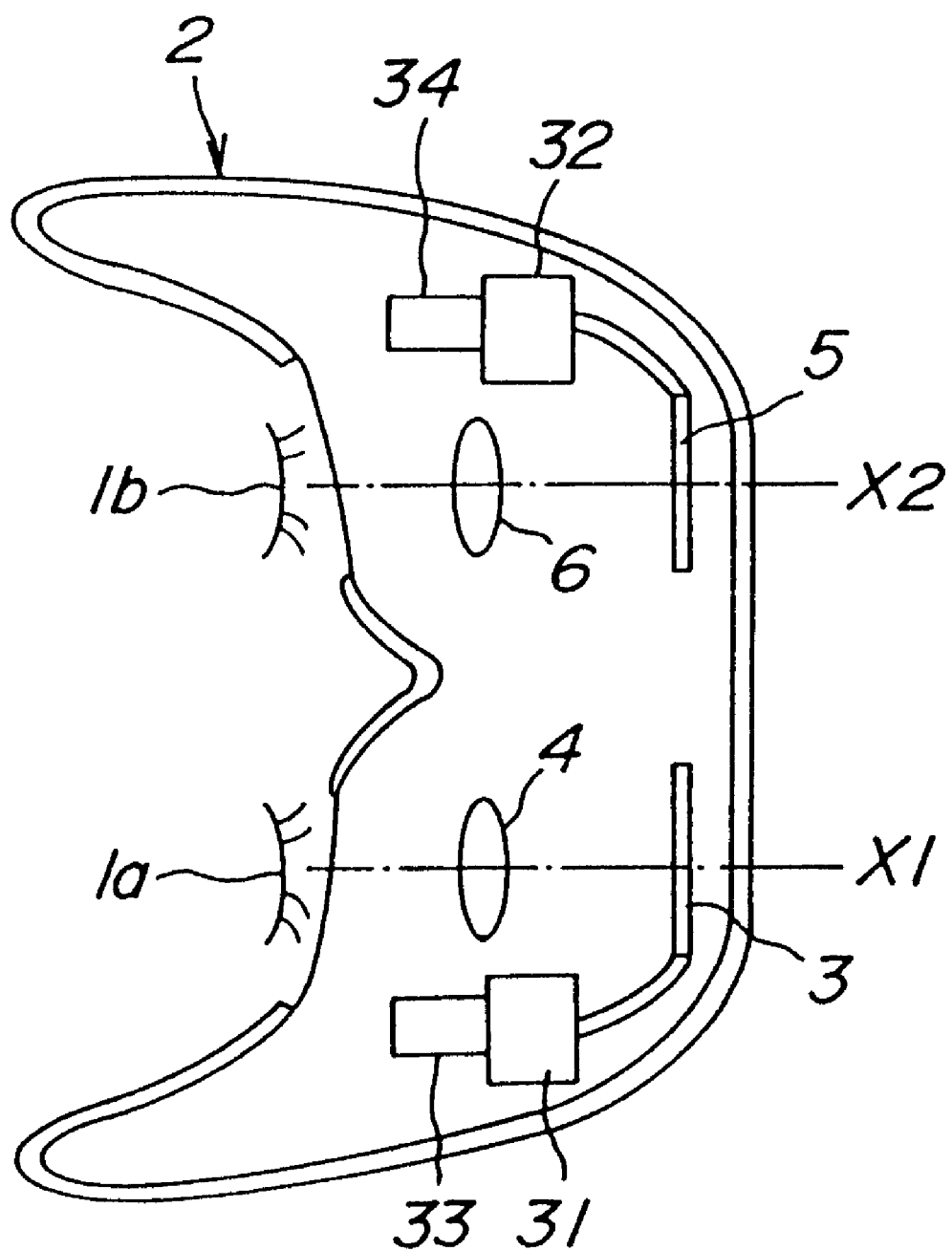

FIG_13
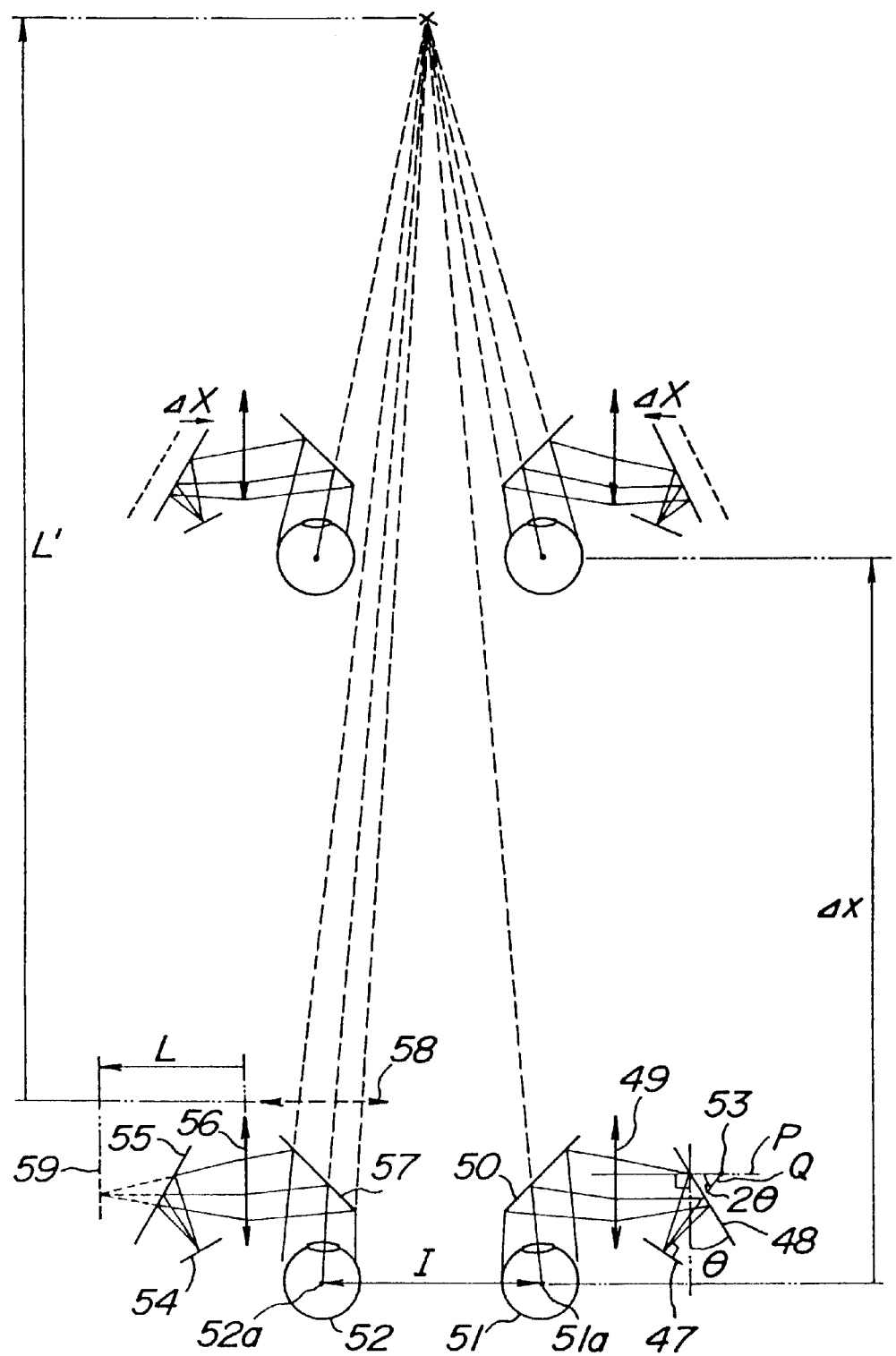

HEAD-MOUNTED TYPE IMAGE DISPLAY SYSTEM

BACKGROUND OF THE INVENTION

Field of the Invention

The present invention relates to a head-mounted type image display system comprising a head-mounted type image display apparatus including first and second image display devices for displaying first and second images and projection optical systems for projecting the thus displayed first and second images onto retinas of right and left eyes of a user as virtual images, and a mounting means for mounting said head-mounted type image display apparatus on the head of the user.

There have been known various head-mounted type image display apparatuses, in which images displayed on first and second image display devices such as liquid crystal display devices (LCD) are projected onto retinas of right and left eyes of a user by means of first and second projecting optical systems, respectively. The projection optical system is usually formed by lens system or concave mirror. Some of these apparatuses are called a face-mounted type or goggle type image display apparatus and some of them are termed as a helmet-type image display apparatus. In the present specification, all of these types are called a head-mounted type image display apparatus. In the head-mounted type image display apparatus, the user can see a large size image while the user is not required to hold the apparatus in position by his or her hand.

FIGS. 1A and 1B show a known head-mounted type image display apparatus disclosed in Japanese Patent Application Laid-open Publication Kokai Hei 2-281891 (prior art publication No. 1). The head-mounted type image display apparatus 150 is mounted on a head 151 of a user as illustrated in FIG. 1A. FIG. 1B is a front view of the head-mounted image display apparatus 150.

The head-mounted type image display apparatus 150 comprises a plurality of back lights 152, two liquid crystal image display devices 153 and two projection lenses 154 for projecting images displayed on the liquid crystal image display devices onto respective retinas of right and left eyes of a user. In this manner, the user can see enlarged virtual images.

In this known head-mounted type image display apparatus, when the head of the user is moved, a displayed seen might be perceived by the user differently from a seen before the movement of the head. So that the user has unusual feeling. In order to mitigate such a drawback, in Japanese Patent Application Laid-open Publications Kokai Hei Nos. 3-56923 and 4-354275 (prior art publications Nos. 2 and 3), there has been proposed a head-mounted type image display system, in which an angular movement of the head of the user is detected and a camera picking up a seen to be displayed is controlled in accordance with a detected movement of the head. In Japanese Utility Model Application Laid-open Publication Kokai Hei No. 3-80384 (prior art publication No. 4) and Japanese Patent Application Laid-open Publications Kokai Hei Nos. 5-241539 and 5-241540 (prior art publications 5 and 6), there has been proposed another known head-mounted type image display system, in which an image signal is converted in accordance with a three-dimensional movement of the head, i.e. up and down, right and left, and back and forth movements of the user's head such that the displayed image is moved in correspondence with the movement of the user's head.

In the above mentioned prior art publications Nos. 2 and 3, only the angular movement of the head of the use is considered and the three-dimensional movement of the head is not considered. In the prior art publications Nos. 4, 5 and 6, there has been disclosed how to convert the image signal in accordance with the three-dimensional movement of the head of the user, but a preferable amount of the displayed image and any correction in accordance with an amount of the movement for displaying a desired image have not been disclosed.

In the above mentioned prior art publications Nos. 5 and 6, there is described as follows: in case of displaying a computer graphic landscape image superimposed on a landscape image seen by the naked eyes of the use with the aid of a half mirrors when the user moves his or her head, the landscape image seen by the naked eyes is also changed or moved. Therefore, it is convenient to change or move the computer graphic image in accordance with the movement of the head of the user. However, the prior art publications do not disclose any concrete construction and operation for realizing the above described conception.

In the known head-mounted type image display apparatuses described in the prior art publications Nos. 5 and 6, a position at which the virtual image seen by the user is formed is determined by a mutual positional relationship between the image display device and the projection optical system, but a positional relationship between the position of the virtual image and the user's eye is fixed. Therefore, when the head of the user is moved, a position of a frame in which the virtual image is formed is moved together with the head of the user, but the virtual image is moved so that the feeling of the virtual reality is decreased. Moreover, when the head of the user is moved back and forth, a magnification of the displayed image is changed accordingly, and thus a diopter of the user is not changed when the user moves back and forth. Therefore, it could not be attained a stereoscopic effect which requires a change in diopter and optical angle.

SUMMARY OF THE INVENTION

The present invention has for its object to provide a novel and useful head-mounted type image display system, in which a virtual image can be seen as if it is maintained at a substantially fixed position even though a head of a user is moved up and down and right and left.

It is another object of the invention to provide a head-mounted type image display system, in which a virtual image can be perceived as being fixed within a frame in the space like as a usual display image within a frame.

It is another object of the invention to provide a head-mounted type image display system, in which a position of a virtual image within the space is remained substantially stationary even when a head of a user is moved back and forth, and further a size of the virtual image is corrected in accordance with the movement of the user's head.

It is still another object of the invention to provide a head-mounted type image display system, in which a virtual image can be seen naturally by both eyes of a user although the user moves closer to the image.

According to a first aspect of the invention, a head-mounted type image display system comprises:

a head-mounted type image display apparatus including a head-mounted type image display device and a mounting means for mounting said head-mounted type image display apparatus on a head of a user, said head-mounted type image display apparatus having first and second image display devices displaying first and second images, respectively and first and second projection optical systems projecting said first and second images displayed on said first and second image display devices onto right and left retinas of a user as virtual images, respectively;

a back and forth movement detecting means for producing a displacement signal representing a direction and an amount Δx of a back and forth movement of a user's head; and a virtual image moving means for responding to said displacement signal to move the virtual images in an opposite direction to the direction of the movement of the user's head by an amount ΔX within a range from 0.8 Δx to 1.2 Δx.

In the head-mounted type image display system according to the first aspect of the invention, the images displayed on the first and second image display devices are projected by the first and second projection optical systems onto the right and left eyes of the user, respectively as the virtual images, and the user can observe a composite virtual image. When the user's head is moved back and forth, the virtual images are moved in a direction opposite to that of the movement of the user's head by a given amount such that the virtual images are perceived by the user to be remained substantially stationary within the space. Therefore, the feeling of the virtual reality can be enhanced.

According to a preferable embodiment of the head-mounted type image display system according to the first aspect of the invention, said virtual image moving means comprises an image display device moving means for moving the first and second image display devices toward the projection optical systems when the user's head is moved forwardly and moving the first and second image display devices away from the projection devices when the user's head is moved backwardly and an image enlarging and reducing means for enlarging the first and second images displayed on the first and second image display means, respectively when the user's head is moved forwardly and reducing the images displayed on the first and second image display devices, respectively when the user's head is moved backwardly.

In this embodiment, when a distance between the image display device and the projection optical system is changed, a projecting magnification is changed accordingly. That is, when the image display device is moved closer to the projection optical system, the projecting magnification becomes smaller, and when the the image display device is moved away from the projection optical system, the projecting magnification becomes larger. Therefore, when the projecting magnification becomes smaller, the displayed image is enlarged and when the projecting magnification becomes larger, the displayed image is reduced, so that a variation in a size of the virtual image due to the variation in the projecting magnification can be corrected. Further, when the projection optical system is fixed and the image display device is arranged movably, there is not produced change in the viewing angle and exit pupil, so that the user can see the virtual image easily.

In another preferable embodiment of the head-mounted type image display system according to the first aspect of the invention, said first and second image display devices are fixed to an housing of the head-mounted type image display device, and said virtual image moving means optical elements for moving conjugate images of the images displayed on said image display devices toward the projection optical systems when the user's head is moved forwardly and moving the conjugate images of the images displayed on said image display devices away from the projection optical systems and an image enlarging and reducing means for enlarging the images displayed on the first and second image display means when the user's head is moved forwardly and reducing the images displayed on the first and second image display devices when the user's head is moved backwardly.

In this embodiment, the image display devices arranged stationary and the conjugate images of the images displayed on the image display devices are moved, so that the wiring to the image display devices can be free from damage due to the movement. The conjugate images may be moved and reduced or enlarged by means of relay optical systems.

In another preferable embodiment of the head-mounted type image display system according to the first aspect of the invention, said virtual image moving means comprises optical means for laterally shifting at least one of said first and second image display devices such that an angle between a first segment connecting a center of the first virtual image formed by the first projection optical system and a center of an exit pupil of the first projection optical system and a second segment connecting a center of the second virtual image formed by the second projection optical system and a center of an exit pupil of the second projection optical system is increased in response to the forward movement of the user's head and is decreased in response to the backward movement of the user's head.

In this embodiment, an optical angle between a right-eye viewing axis and a left-eye viewing axis is increased when the user moves closer to the image, and thus the user can see the close image by both the right and left eyes easily.

In another preferable embodiment of the head-mounted type image display system according to the first aspect of the invention, said virtual image moving means comprises optical means for laterally shifting at least one of said conjugate images such that an angle between a first segment connecting a center of the first virtual image formed by the first projection optical system and a center of an exit pupil of the first projection optical system and a second segment connecting a center of the second virtual image formed by the second projection optical system and a center of an exit pupil of the second projection optical system is increased in response to the forward movement of the user's head and is decreased in response to the backward movement of the user's head.

Also in this embodiments an optical angle between a right-eye viewing axis and a left-eye viewing axis is increased when the user moves closer to the image, so that the user can see the close image by both the right and left eyes easily. In this case, since the image display devices are fixed, the wiring therefor can be free from the movement.

According to a second aspect of the present invention, a head-mounted type image display system comprises:

a head-mounted type image display apparatus including a head-mounted type image display device and a mounting means for mounting said head-mounted type image display apparatus on a head of a user, said head-mounted type image display apparatus having first and second image display devices displaying first and second images, respectively and first and second projection optical systems projecting said first and second images displayed on said first and second image display devices onto right and left retinas of a user as virtual images, respectively;

a movement detecting means for producing a displacement signal representing a direction and an amount Δy of up and down or right and left movement of a user's head;

a virtual image moving means for responding to said displacement signal to move the virtual images in a direction opposite to the direction of the movement of the user's head by an amount within a range from 0.8 Δy to 1.2 Δy;

an original signal generating means for generating an original image signal;

an image signal converting means connected to said movement detecting means and original image signal generating means for converting said original image signal in accordance with said displacement signal to derive a converted image signal which can be displayed by said image display devices;

whereby said virtual image moving means is constructed such that upon supplying said converted image signal from said image signal converting means to the image display devices, a condition of $0.8<\Delta y/(\beta \cdot \Delta Y)<1.2$ is satisfied, wherein $\beta$ is an absolute value of a lateral magnification of the projection optical systems and $\Delta Y$ is an absolute value of an amount of the movement of the first and second images on the first and second image display devices, respectively.

In the head-mounted type image display system according to the above mentioned second aspect of the invention, the first and second images displayed on the first and second image display devices, respectively are projected onto the right and left eyes of the user as the first and second virtual images. These virtual images are moved in a direction opposite to that of the up and down or right and left movement of the user's head by an amount within a range from 0.8 to 1.2 times of that of the movement of the user's head.

Since the image display apparatus is mounted on the user's head, the user can perceive the virtual images to be remained stationary even if the user's head is moved up and down or right and left, because the movement of the virtual images in response to the movement of the user's head is suppressed smaller than a fifth of the movement of the user's head. The movement detecting means may be constructed to detect the actual movement of the user's head or to detect a movement of a seat on which the user sits down.

Further, the image signal supplied to the image display devices is extracted from the original image signal in response to the displacement signal, and therefore an image portion to be displayed by the image display devices can be moved in accordance with the up and down or right and left movement of the user's head, and a feeling of the virtual reality can be enhanced.

Moreover, the virtual images are moved in accordance with the displacement signal such that the condition of $0.8<\Delta y/(\beta \cdot \Delta Y)<1.2$ is satisfied. Then, an amount of the movement of the virtual images can be less than a fifth of that of the movement of the user's head, so that the user can perceive the virtual images to be remained stationary within the space.

In a preferable embodiment of the head-mounted type image display system according to the second aspect of the invention, said original image is a signal including a frame signal of a field of view, and said image converting means is constructed such that an image of the frame is enlarged or reduced in accordance with the movement of the user's head.

In another preferable embodiment of the head-mounted type image display system according to the second aspect of the invention, when the user's head is moved in one direction beyond a predetermined range, the virtual images are not moved, but when the user's head is moved in a direction opposite to said one direction, the images are moved on the image display devices in such a manner that the above mentioned condition of $0.8<\Delta y/(\beta \cdot \Delta Y)<1.2$ is satisfied.

A head-mounted type image display system according to a third aspect of the invention comprises:

a head-mounted type image display apparatus including a head-mounted type image display device and a mounting means for mounting said head-mounted type image display apparatus on a head of a user, said head-mounted type image display apparatus having first and second image display devices displaying first and second images, respectively and first and second projection optical systems projecting said first and second images displayed on said first and second image display devices onto right and left retinas of a user as virtual images, respectively;

a movement detecting means for producing a displacement signal representing a direction and an amount Δy of up and down or right and left movement of a user's head;

a virtual image moving means for responding to said displacement signal to move the virtual images in a direction opposite to the direction of the movement of the user's head by an amount within a range from 0.8 Δy to 1.2 Δy;

an original signal generating means for generating an original image signal;

an image signal converting means connected to said movement detecting means and original image signal generating means for converting said original image signal in accordance with said displacement signal to derive a converted image signal which can be displayed by said image display devices;

whereby said virtual image moving means is constructed to move the image display devices on image display plane of the image display devices such that a condition of $0.8<\Delta y/(\beta \cdot \Delta Y')<1.2$ is satisfied, wherein $\beta$ is an absolute value of a lateral magnification of the projection optical systems and $\Delta Y'$ is an absolute value of an amount of the movement of the first and second image display devices on the image planes thereof.

In this head-mounted image display system, by moving the image display devices such that the above mentioned condition is satisfied. Then, an amount of the movement of the virtual images can be suppressed not larger than a fifth of the actual amount of the movement of the user's head, so that the user can perceive the virtual images to be remained substantially stationary.

In a preferable embodiment of the head-mounted type image display system according to the third aspect of the invention, when the user's head is moved in one direction beyond a predetermined range, the image display devices are not moved, but when the user's head is moved in a direction opposite to said one direction, the image display devices are moved in such a manner that the above mentioned condition of $0.8<\Delta y/(\beta \cdot \Delta Y')<1.2$ is satisfied.

A head-mounted type image display system according to a third forth aspect of the invention comprises:

a head-mounted type image display apparatus including a head-mounted type image display device and a mounting means for mounting said head-mounted type image display apparatus on a head of a user, said head-mounted type image display apparatus having first and second image display devices displaying first and second images, respectively and first and second projection optical systems projecting said first and second images displayed on said first and second image display devices onto right and left retinas of a user as virtual images, respectively;

a movement detecting means for producing a displacement signal representing a direction and an amount $\Delta y$ of up and down or right and left movement of a user's head;

a virtual image moving means for responding to said displacement signal to move the virtual images in a direction opposite to the direction of the movement of the user's head by an amount within a range from 0.8 $\Delta y$ to 1.2 $\Delta y$;

an original signal generating means for generating an original image signal;

an image signal converting means connected to said movement detecting means and original image signal generating means for converting said original image signal in accordance with said displacement signal to derive a converted image signal which can be displayed by said image display devices;

whereby said first and second image display devices are fixed to a housing of the head-mounted type image display device, and said virtual image moving means comprises optical means for moving conjugate images formed on conjugate planes of the image display planes of the first and second image display devices, respectively on said conjugate images, said optical means being constructed to move said conjugate images on said respective conjugate planes such that a condition of $0.8 < \Delta y / (\beta \cdot \Delta Y') < 1.2$ is satisfied, wherein $\beta$ is an absolute value of a lateral magnification of the projection optical systems and $\Delta Y'$ is an absolute value of an amount of the movement of said conjugate images on said respective conjugate planes.

In the head-mounted type image display system according to the fourth aspect of the invention, since the conjugate images are moved on respective conjugate planes in accordance with the up and down or right and left movement of the user's head and the image display devices are fixed to the housing of the head-mounted type image display device, and therefore the wiring for the image display devices can be free from damage.

In a preferable embodiment of the head-mounted type image display system according to the fourth aspect of the invention, when the user's head is moved in one direction beyond a predetermined range, the image display devices are not moved, but when the user's head is moved in a direction opposite to said one direction, the image display devices are moved in such a manner that the above mentioned condition of $0.8 < \Delta y / (\beta \cdot \Delta Y') < 1.2$ is satisfied.

BRIEF DESCRIPTION OF THE DRAWINGS

FIGS. 1A and 1B show a known head-mounted type image display system;

FIG. 2 is a schematic view illustrating a first embodiment of the head-mounted type image display system according to the invention;

FIG. 3 is a schematic view depicting the image display apparatus of the first embodiment;

FIG. 4 is a schematic view explaining the operation of the first embodiment;

FIG. 7 is a schematic view depicting an operation of a first modification of the first embodiment;

FIGS. 8A and 8B are schematic views showing a second modification of the first embodiment;

FIG. 10 is a schematic view depicting the image display apparatus of the second embodiment;

FIG. 13 is a schematic view illustrating a fifth embodiment of the image display system according to the invention.

DESCRIPTION OF THE PREFERRED EMBODIMENTS

Figure 5:
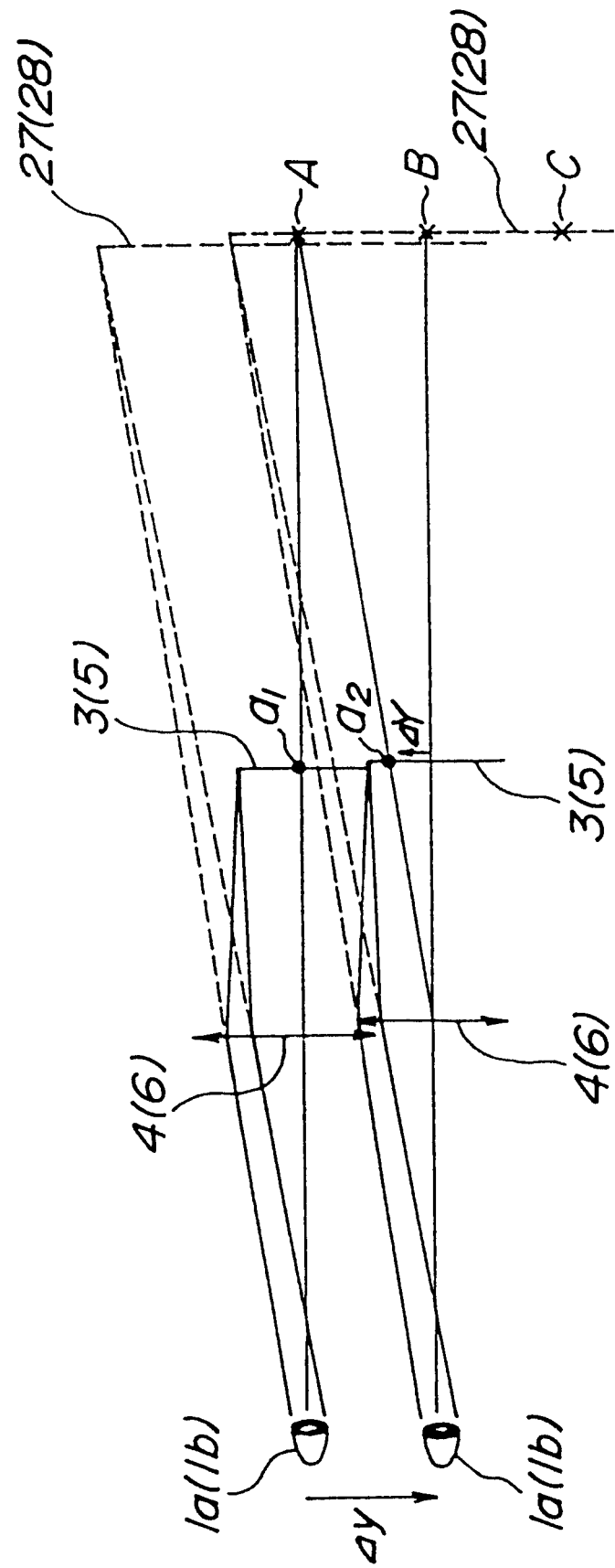
FIG. 5 is a schematic view showing the operation of the first embodiment.

According to the invention, a displayed virtual image is perceived by a user or viewer as if the image is substantially fixed within the space even when the user's head is moved up and down or right and left or back and forth. To this end, the virtual image is shifted relative to the user in a direction which is opposite to a direction of the movement of the head by an amount which is substantially equal to an amount of the movement of the head.

In case of shifting the displayed virtual image by moving the image display devices or shifting the images displayed by the image display devices, it is necessary to take into account a lateral magnification of the projection optical system. The lateral magnification $\beta$ of the projection optical system expressed by a ratio of a height h' of a projected image of a small segment extending perpendicularly to an optical axis of the projection optical system on an image to be projected to a height h of said segment on the image plane, i.e. $\beta = h'/h$.

Therefore, when the images to be projected onto the right and left eyes of the user are moved by a certain distance, the projected image, i.e. the virtual image, is moved by a distance which is equal to a product of said distance and $\beta$. It is now assumed that an absolute value of an amount of a movement of the displayed image is denoted by $\Delta Y$ and an absolute value of an amount of a movement of the user's head is expressed by $\Delta y$. Then the virtual image can be perceived to be remained stationary within the space when the displayed image is moved in a direction opposite to a direction of the movement of the user's head such that the following condition is satisfied:

$$\Delta y = \beta \cdot \Delta Y.$$

In this case, the inventor has confirmed that even if a slight deviation in an amount of the movement $\Delta y$ from the above value occurs, a feeling of a fixed image is not substantially lost. The inventor has confirmed experimentally that as long as the movement of the displayed image within a given condition is concerned, an amount of the movement of the displayed image can be smaller than a fifth of an amount of the movement of the head of the user. That is, an amount of the movement of the displayed image can be smaller than 80% of that of the movement of the user's head.

It should be noted that the lateral magnification $\beta$ may be expressed by a focal length f of the projection optical system and a distance Z between a focal point of the projection optical system on a side of the image display device to an image display plane of the image display device as follows:

$$\beta = f/Z$$

Now several embodiments of the head-mounted type image display system according to the invention based on the above mentioned principal conception will be explained with reference to the accompanying drawings.

FIGS. 2–6 show a first embodiment of the head-mounted type image display system according to the invention. FIG. 2 is a schematic view illustrating a whole construction of the system. A user 1 wears a head-mounted type image display apparatus 2 on his or her head and is watching a virtual image formed by the image display apparatus 2.

As depicted in FIG. 3, the head-mounted type image display device 2 comprises a right-eye liquid crystal image display (LCD) 3 positioned in front of a right-eye 1a of the user, a right-eye projection optical system 4 arranged between the right-eye LCD 3 and the right-eye 1a, a left-eye LCD 5 arranged in front of the right-eye 1b of the user, and a left-eye projection optical system 6 provided between the left-eye LCD 5 and the left-eye 1b.

The head-mounted type image display device 2 further includes a driving device 7 which is coupled with a suitable driving source such as linear motor and ultrasonic motor. In the present embodiment, the driving device 7 is constructed to move the right-eye and left-eye LCDs 3 and 5 along a rail 8 in a direction parallel to optical axes X1 and X2 of the right-eye and left-eye projection optical systems 4 and 6, respectively. The right-eye and left-eye LCDs 3 and 5 are further moved in a direction perpendicular to the optical axes X1 and X2 along cam recesses 9 and 10 by means of expandable portions 11 and 12 provided between the driving device 7 and the LCDs 3 and 5, respectively. That is, the LCDs 3 and 5 are moved in a lateral direction in accordance with the back and forth movement of the LCDs.

The optical axes X1 and X2 of the right-eye and left-eye projection optical systems 4 and 6 are separated from each other by a distance I of about 7 cm and these optical systems have a focal length of about 4 cm. The distance Z between principal points of the projection optical systems 4 and 6 on a side of the LCDs 3 and 5 to the image display planes of the LCDs, respectively are about 3.9 cm, so that the magnifications $\beta$ of these projection optical systems are about 40. Therefore, the virtual images are formed at a point which is separated from the principal points of the optical systems on a side of the user's eyes by about 156 cm.

As shown in FIG. 2, there is provided a rubber band 13 by means of which the image display device 2 is held on the user's head 1. Hereinafter, an assembly of the head-mounted type image display device 2 and rubber band 13 is termed a head-mounted type image display apparatus 15. A light emitting diode 14 emitting infrared light having a specific wavelength is provided on a center of the head-mounted type image display device 2.

As illustrated in FIG. 2, there are arranged first and second light receiving lenses 16 and 17 which are aligned horizontally and are separated from each other by a given distance. Behind the first and second lenses 16 and 17 are arranged first and second light receiving elements 18 and 19, respectively. Each of the first and second light receiving elements 18 and 19 is formed by light receiving regions arranged two-dimensionally. It should be noted that the first and second lenses 16 and 17 and light receiving elements 18 and 19 are provided at predetermined given positions in front of the user 1.

The first and second light receiving elements 18 and 19 are connected to a movement detection device 20, and an amount and a direction of movement of the head-mounted type image display device 2 and thus the user's head are derived by suitably processing output signals from the first and second light receiving elements 18 and 19. That is to say, positions of the light rays impinging upon the first and second light receiving elements 18 and 19 are detected and then an amount and a direction of the movement of the user's head can be derived from the thus detected positions. A displacement signal representing the thus detected amount and direction of the movement of the head of the user is supplied to an image signal converter 21 to which is also connected an original image signal source 22. The image signal converter 21 serves to convert an original image supplied from the original image signal source 22 in accordance with the displacement signal supplied from the movement detection device 20. The image signal converter 21 picks-up or extracts a portion of the original image to be displayed by the LCDs 3 and 5 and enlarges or reduces a size of the thus extracted image portion. The image signal converter 21 also serves to transmit the thus converted image signal to the head-mounted type image display device 2 via an areal 23. The image signal converter 21 further functions to transmit a control signal for the driving device 7, so that the LCDs 3 and 5 are moved in a given direction by a given amount.

Light emitted by the light emitting diode 14 provided on the head-mounted type image display device 2 is guided onto the light receiving elements 18 and 19 by means of the lenses 16 and 17, respectively, and then the light receiving elements 18 and 19 produce signals each denoting a position on a respective light receiving element at which the light is made incident. These signals are supplied to the user movement output device 20. The user movement detection device 20 calculates a position of the light emitting diode 14 in a space from the signals supplied from the light receiving elements 18 and 19.

Now a method of converting the original image signal supplied from the original image signal source 22 in accordance with the displacement signal supplied from the movement detection device 20 will be explained. FIG. 4 is a schematic view explaining the image signal conversion. In FIG. 4, a reference numeral 24 denotes the original image supplied from the original image signal source 22. It should be noted that the original image has a size larger than the display planes of the LCDs 3 and 5. In FIG. 4, a reference numeral 25 represents an extracted image portion which is to be displayed by the LCDs 3 and 5 at a standard condition prior to the movement of the user's head. It should be noted that in this standard condition, the head of the user 1 is situated at a predetermined position and a spatial position of the user's head detected by the movement detection device 20 is within a predetermined range.

When the user's head is moved from the standard position, the image signal converter 21 extracts a portion of the original image signal which is shifted with respect to the image portion 25 before the movement in a given direction by an amount corresponding to the detected amount of the movement of the user's head. In this case, in order to keep the image portion 25 to be displayed in front of the eyes of the user, the image portion 25 is moved in the same direction as that of the movement of the user's head. For instance, when the head of the user is moved downward, a new display portion 26 which is shifted downwardly with respect to the image portion 25 is extracted. When the magnification of the projection optical system is $\beta$, the distance of the movement of the displayed image ΔY is set to about Δy/β, where Δy is a distance of the actual movement of the user's head. In the present embodiment, the magnification β of the projection optical system is set to about 40 under a condition in which the user's head is in the standard position. Therefore, an amount of the movement Δy of the displayed image on the image display device will amount to about Δy/β. This signal is received by the areal 23 (FIG. 2) and corresponding image signals are supplied to the LCDs 3 and 5 and are displayed thereon.

For instance, when the user's head is moved downward by 20 cm, the image signal conversion is carried out such that the image displayed on the image display device is moved upward by 0.5 cm. Then, the virtual image is moved upward by a distance which is forty times larger than said distance of 0.5 cm, i.e. 20 cm. That is to say, when the user's head is moved up and down or right and left, the virtual images are moved in a direction opposite to a direction of the movement of the user's head by a corresponding distance with respect to the rubber band which is secured to the user's head. Therefore, even if the user's head is moved up and down or right and left, the virtual images can be perceived by the user to be kept stationary within the space and the field of view is moved with respect to the stationary virtual images.

In the present embodiments the magnification β is changed as will be explained later, so that an absolute value of the distance of movement ΔY of the image on the LCDs 3 and 5 (FIG. 3) is kept to be Δy/β. The above mentioned distances ΔY and Δy may be derived from the originally determined standard position or may be derived from a desired position which is assumed to be a new standard position.

FIG. 5 is a schematic view showing the above explained function. A light flux emanating from the LCD 3 (5) is enlarged by the projection optical system 4 (6) to form a virtual image 27 (28). An upper portion in FIG. 5 illustrates an optical path in the standard condition, in which the LCD 3 (5) displays the image portion 25 (FIG. 4). A center of the displayed image is denoted by A and on LCD 3 (5). the center A is displayed at a1 on an optical axis, said a1 being resulted into the center A on the virtual image 27 (28).

A lower optical path shows a condition when the user's head is moved downward. The optical axis is moved downward by a distance Δy with respect to the optical axis in the standard condition. Then, LCD 3 (5) displays the image portion 26 as the result of the image signal conversion, in which the center B is shifted downward by a distance ΔY with respect to the center A. The center A is displayed on LCD 3 (5) at a2 which is shifted upwardly from the optical axis by ΔY, said a2 being displayed at A on the virtual image by means of the projection optical system 4 (6). In this manner, a position of the virtual image within the space is not moved even though the user's head is moved, and information of C shown in FIG. 4 is newly displayed.

In the present embodiment, a direction and an amount of a back and forth movement of the user's head detected by the user movement detecting device 20 are derived, and the image is enlarged or reduced about a center thereof by the image signal convertor 21 (FIG. 2). At the same time, the LCDs 3 and 5 are moved by the driving device 7 (FIG. 3) in accordance with the detected direction and amount of the back and forth movement of the head of the user.

Now a determination of an amount of the movement of the LCDs 3 and 5 will be explained with reference to FIG. 6. Now it is assumed that a distance between the display plane of LCDs 3 and 5 in the standard condition and the principal point of the projection optical systems 4 and 6 on the side of the LCDs is denoted by L, a distance between the virtual image and the principal point of the projection optical system on the side of the observer is L', a focal length of the projection optical systems 4 and 6 is f, and a forward movement of the user's head detected by the user movement detecting device 20 (FIG. 2) is represented by Δx. Then, a direction and an amount of the movement ΔX of a movement of LCDs 3 and 5 may be derived to a value which substantially satisfies a condition of $1/(L-\Delta X)-1/(L'-\Delta x)=1/f$. It should be noted that an amount of the movement of the virtual image is preferably set to be smaller than an amount of the movement of the user's head by five times. Then, an amount of the movement of the LCDs 3 and 5 ΔX may be set to satisfy the following condition:

$$L-f(L'-0.8\,\Delta x)/(f+L'-0.8\Delta x) < \Delta X < L-f(L'-1.2\Delta x)/(f+L'-1.2\Delta x)$$

It should be noted that L' may be represented by $Lf/(f-L)$.

If ΔX is positives LCDs 3 and 5 are moved toward the projection optical systems 4 and 6 by a calculated amount. If ΔX is negative, the LCDs 3 and 5 are moved away from the projection optical systems 4 and 6 by a calculated amount. In accordance with the calculated ΔX, the image of the standard condition is reduced or enlarged by a value within a range from 0.8 $(L'(L-\Delta X))/(L(L'-\Delta x))$ to 1.2 $(L'(L-\Delta X))/(L(L'-\Delta x))$. The reduction or enlargement is carried out about the center of the displayed image. In this manner, a change in the projecting magnification due to the movement of the LCDs 3 and 5 can be cancelled out or compensated for.

In the present embodiment, if the user's head is moved forwardly from the standard position by 50 cm, the LCDs 3 and 5 are moved closer to the projection optical systems 4 and 6 by 0.05 cm and at the same time the image is enlarged by 1.45 about its center. The thus converted image signal as well as the control signal are received by the areal 23 (FIG. 2) and the enlarged images are displayed on the LCDs 3 and 5 which are moved by the driving device 7 in a given direction by a given amount.

As explained above, when the user's head is moved back and forth, the LCDs 3 and 5 are moved such that the virtual image is moved in a direction opposite to that of the movement of the user's head by the same amount as that of the movement of the user's head, and thus the virtual image is perceived to be stationary even if the user's head is moved back and forth. Moreover, a change in the projecting magnification is compensated for electrically. It should be noted that the above mentioned values ΔX, Δx, L and L' may be derived from the standard position or may be derived from a desired position by assuming the desired position as a new standard position.

Figure 6:
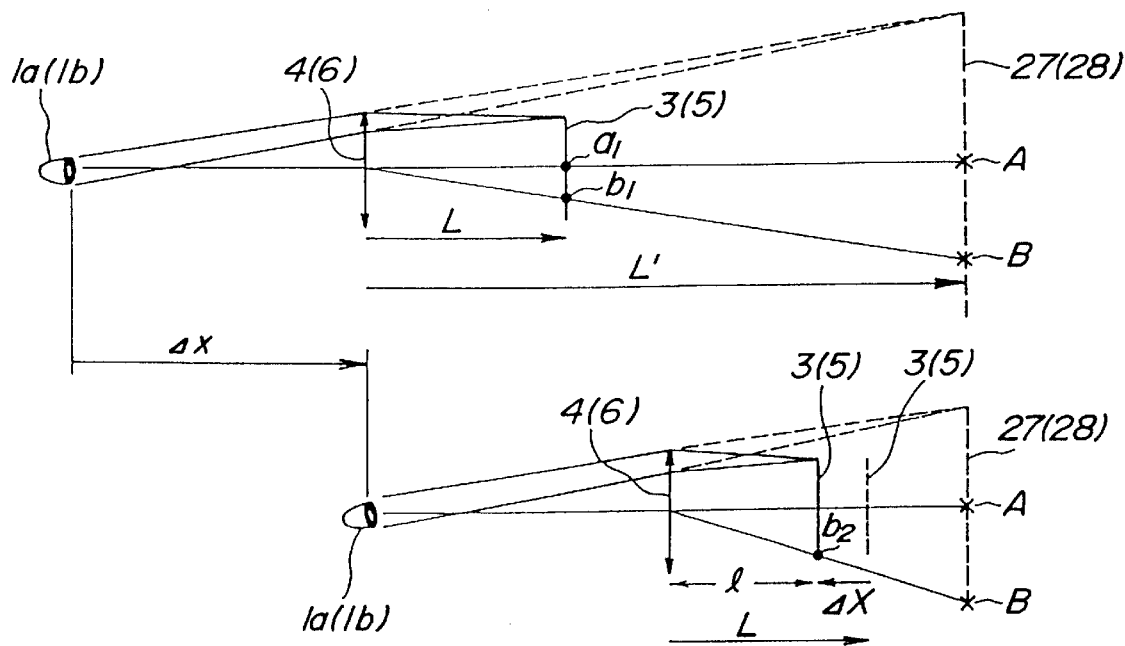
FIG. 6 is a schematic view illustrating the optical path of the first embodiment.

As shown in FIG. 6, a light flux emanating from the LCD 3 (5) is enlarged by the projection optical system 4 (6) to form an enlarged virtual image 27 (28). An upper portion of the optical system shown in FIG. 6 denotes the standard condition, in which the LCD 3 (5) displays the image portion 25 in FIG. 4. In this condition, the center of the displayed image is the point A in FIG. 4 and is displayed at the point a1 on the optical axis on the LCD 3 (5). The point a1 is projected on the point A on the virtual image by means of the projection optical system 4 (6). The point B shown in FIG. 4 is displayed at the off-axis point b1 on the LCD 3 (5) and this point b1 forms the point B on the virtual image by means of the projection optical system 4 (6).

A lower portion of the optical system of FIG. 6 denotes a condition in which the user's head is moved from the standard condition. In this example, the user's eye 1a (1b) as well as the LCD 3 (5) and projection optical system 4 (6) are moved forwardly by a distance Δx. In this case, the LCD 3 (5) is moved toward the projection optical system 4 (6) by a distance ΔX, so that the position of the virtual image 27 (28) within the space is not changed. That is to say, the image display device is moved in a direction opposite to a direction of the movement of the user's head.

Further the image signal of the image portion 30 is enlarged about the center A in FIG. 4 thereof. Then, the point B in FIG. 4 is displayed at an off-axis point b2 on the LCD 3 (5) and this point b2 displayed by projection optical system 4 (6) on the virtual image at the same point at which the point b2 is displayed in the standard condition. Therefore, the position and size of the virtual image are not changed even if the user's head is moved back and forth. In FIG. 6, for the sake of simplicity, a distance between the principal point of the projection optical system 4 (6) on the side of the LCD and the principal point on the side of the user's eye is set to zero, but the positions of these principal points have been taken into account in the above explanation.

In the present embodiment, an optical angle of the right and left images perceived by the right and left eyes is increased in accordance with the movement of the LCD 3 (5) toward the projection optical system 4 (6), LCDs 3 and 5 are moved along the cam recesses 9 and 10 shown in FIG. 3. Now it is assumed that a distance between the optical axes X1 and X2 of the projection optical systems 4 and 6 just in front of the user's eyes 1a and 1b is denoted by I (FIG. 3), a distance between the virtual image formed after the movement of the LCDs 3 and 5 due to the movement of the user's head and the principal points of the projection optical systems 4 and 6 on the side of the user's eyes is represented by l', and a distance between the principal points of the projection optical systems on the side of the user's eyes and an exit pupil is set to be f equal to the focal length of the projection optical systems. Then, the LCDs 3 and 5 are preferably moved along the recesses 9 and 10 by such an amount of that an amount of eccentricity ΔZ of the center of the LCD with respect to the optical axis is set to be substantially equal to If/(2(f+l')). The present embodiment also satisfies this condition and an amount of eccentricity ΔZ is set to l4/(4+l') cm.

The cam recesses 9 and 10 are shaped such that an amount of a deviation ΔZ is varied in relation to a distance l between the principal point of the projection optical system 4 (6) on the side of the LCD 3 (5) and the display plane of the LCD 3 (5) so that ΔZ is substantially equal to I(f−l)/(2f). That is, viewed in FIG. 3, the cam recesses 9 and 10 formed to correspond to the centers of the LCDs 3 and 5 are substantially corresponded to segments formed by connecting a center point of a segment connecting the principal points of the projection optical systems 4 and 6 on the side of the LCDs 3 and 5 and focal points of the projection optical systems 4 and 6, respectively. Then, when the LCDs 3 and 5 are moved toward the projection optical systems 4 and 6, respectively upon the movement of the user's head in a forward direction, the virtual image can be perceived by the right and left eyes of the user at an optical angle which is substantially corresponding to the position of the virtual image, so that no unusual feeling occurs even when the user moves toward the virtual image.

In the present embodiment of the head-mounted type image display apparatus, although the user's head is moved up and down or right and left or back and front or in any combination thereof, the virtual image is not moved within the space and the virtual image is perceived to be stationary within the space although the image display devices are moved together with the user's head. This results in that the perception of the virtual reality can be improved.

In the present embodiment, the mechanism for detecting the position of the head of the user and the device for converting the image signal are provided outside the head-mounted type image display apparatus so that the image display apparatus can be small in size. However, according to the invention, a range measuring means such as an active range finding device generally used in a camera may be provided on the image display apparatus. Then, the position of the user's head may be detected relative to a distance to a subject surrounding the user.

It should be further noted that instead of moving the liquid crystal image display back and forth, a secondary image formed by a relay lens may be moved or a magnification of the virtual image may be changed by a variable magnification lens. In the present embodiment, the movement of the liquid crystal displays in the lateral direction is limited by the fact that the liquid crystal display is urged against the driving device, so that the liquid crystal displays could not be moved over a wide range. When the liquid crystal displays are shifted by means of optical bending optical systems, the liquid crystal displays may be further moved and the optical angle may be adjusted over a wider range. Moreover, the projection optical system may be formed by a zoom lens, and the position of the virtual image and the magnification of the virtual image may be varied by adjusting the zoom lens.

FIG. 7 is a schematic view showing an operation of a first modification of the first embodiment so far explained. In this modification, the image is not displayed over the entire image display surface, but when the user's head is moved, a position and a size of a black frame 30 defining a region of an image portion displayed on the liquid crystal image display are moved or changed in accordance with the movement of the head of the user. Then, the image and the frame defining an edge 29a of the image are moved together, so that they are perceived as a virtual monitor within the space. The movement of the displayed image portion 25 is identical with that of the first embodiment, so that its explanation is dispensed with.

FIGS. 8A and 8B are schematic views representing an operation of a second modification of the first embodiment. In this modification, as long as the movement of the user's head is within a predetermined range W1, the image is not moved at all as shown in FIG. 8A, but when the user's head is moved beyond this range as shown by W2 in FIG. 8B, the image is moved together with the user's head. When the user's head is moved beyond the range W1 of FIG. 8B, the displayed image on the image display device is moved such that the above mentioned condition of 0.8<Δy/(β·ΔY)<1.2 is satisfied. Also in this case, the user can perceive the virtual image to be stationary within the space. It should be noted that the movement of the user's head can be detected in the same manner as that of the first embodiment.

Figure 9A:
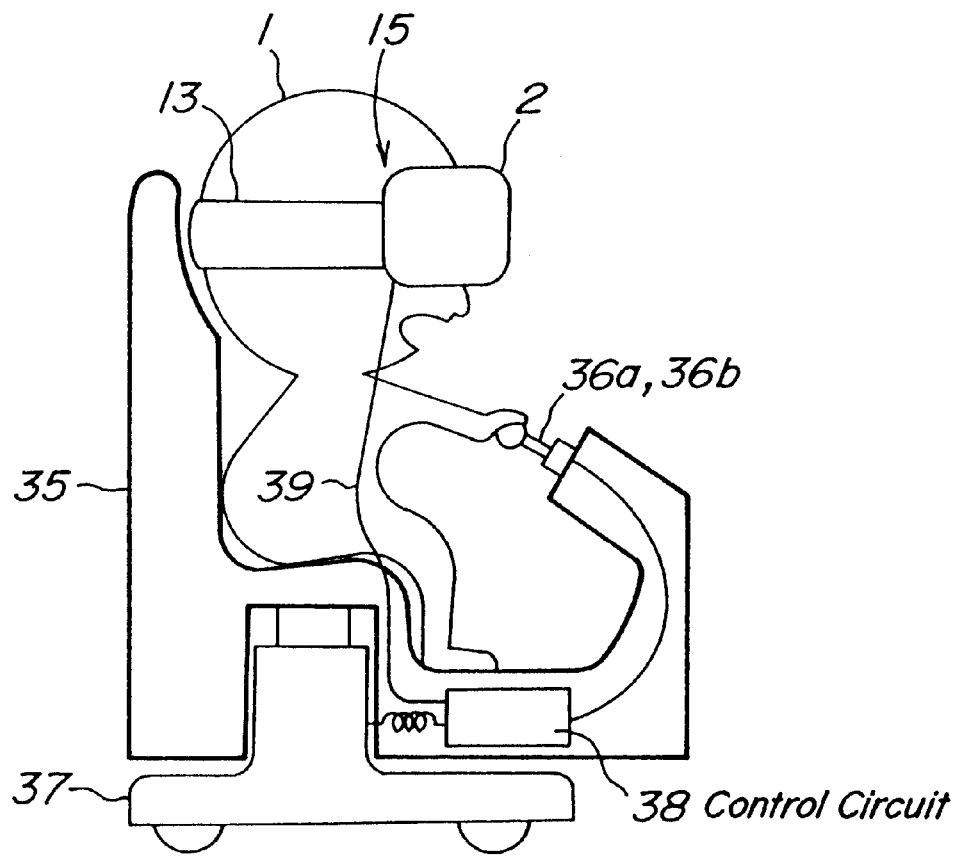
FIGS. 9A and 9B illustrate a second embodiment of the image display system according to the invention.
Figure 9B:
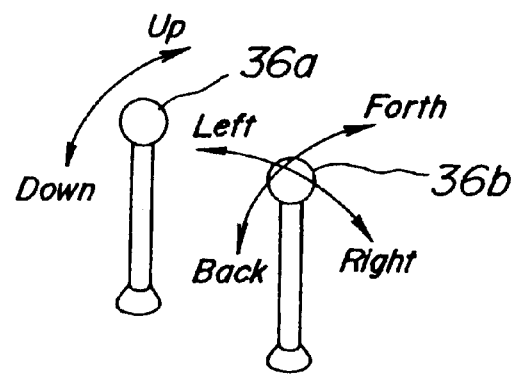

FIGS. 9 and 10 show a second embodiment of the head-mounted type image display system according to the invention, in which portions similar to those of the first embodiment are denoted by the same reference numerals used in the first embodiment. FIG. 9A is a schematic view showing a whole construction of the head-mounted type image display system and FIG. 9B is a perspective view illustrating an operation levers. FIG. 10 is a schematic cross sectional view of the head-mounted type image display apparatus of the present embodiment.

As shown in FIG. 10, right-eye liquid crystal display 3 and right-eye projection optical system 4 are arranged in front of the right eye 1a of the user and left-eye liquid crystal image display 5 and left-eye projection optical system 6 are provided in front of the left eye 1b of the user. The LCDs 3 and 5 are arranged to be movable by means of driving devices 31 and 32, respectively, said driving devices being movable along rails 33 and 34 substantially in parallel with optical axes X1 and X2 of the projection optical systems 4 and 6. The LCDs 3 and 5 are moved in a direction perpendicular to the optical axes X1 and X2.

As depicted in FIG. 9A, the user 1 wearing the head-mounted type image display apparatus 15 by means of the rubber band 13 sits on a seat 35 which is movable up and down by means of an operation lever 36a as well as right and left and back and forth by means of an operation lever 36b as shown in FIG. 9B. Underneath the seat 35 is provided a seat driving device 37 for moving the seat up and down, right and left and back and forth.

Within the seat 35, there is arranged a signal forming device 38 which generates a control signal for the driving devices 31, 32 moving the LCDs 3 and 5, an image signal whose magnification has been changed and a control signal for the seat driving device 37.

Now the operation of the second embodiment will be explained. When the user 1 operates the operation levers 36a and 36b, this is detected by the signal forming device 38, and the control signal for the LCD driving devices 31 and 32, the control signal for the seat driving device 37 and the converted image signal. The seat driving control signal is supplied to the driving device 37 and the seat 35 is moved up and down, right and left and back and forth in accordance with the operation of the levers 36a and 36b. In this case, when the seat 35 is moved back and forth or right and left, the seat 35 may be inclined or tilted in a direction opposite to the movement of the seat in order to enhance the feeling of the back and forth movement as well as the right and left movement.

In the present embodiment, the operation of the levers 36a and 36b represent the movement of the user's head, so that the the control signal derived by detecting the operation of the levers is supplied to the driving devices 31 and 32 for moving the LCDs 3 and 5. At the same time, the image signal generated by the original image signal source not shown is converted in accordance with the detected movement of the user's head.

Next a manner of deriving the control signal for the LCD driving devices 31 and 32 will be explained. When the head of the user is positioned at a predetermined position, it is assumed that the user's head is in a standard condition. In this embodiment, when the seat 35 is set at about the middle of the up and down movement, right and left movement, and back and forth movement, the user's head is assumed to be in the standard condition.

At first, a direction and a time duration of the up and down movement and right and left movement are extracted by detecting an operating direction and an operation time of the operations levers 36a and 36b. Then, the LCDs 3 and 5 are moved in a direction opposite to the detected direction of the movement of the seat for the detected time duration at a constant speed. For instance, when the operator 1 operates the lever 36b to move the seat in the rightward directions the LCDs 3 and 5 are moved in the leftward direction at a constant speed for a time duration during which the seat is moved in the rightward direction.

The moving speed of the LCDs 3 and 5 is determined such that the virtual image is maintained stationary within the space. It is assumed that a distance over which the seat 35 is moved is denoted as $\Delta y$ and a magnification of the projection optical systems 4 and 6 is $\beta$, then a distance $\Delta Y'$ over which the LCDs are moved is set to $\Delta y/\beta$. In the present embodiment, a magnification of the projection optical systems 4 and 6 is set to 40 in the standard condition, the control signal representing an amount of the movement ($\Delta Y'=\Delta y/40$) of the LCDs 3 and 5 is generated and is supplied to the head-mounted type image display apparatus 2 via a conductor 39.

For instances when the user's head is moved in the rightward direction at a speed of 10 cm/sec for two seconds, the LCDs 3 and 5 are moved in the leftward direction at a speed of 0.25 cm/sec for two seconds. In this case, the virtual image is actually moved in the leftward direction at a speed of 10 cm/sec for two seconds, so that the virtual image is perceived by the user to be stationary within the space.

In a modification of the second embodiment just explained above, when the magnification of the projection optical systems 4 and 6 is $\beta$, an amount of the movement $\Delta Y'$ of the LCDs is set to be larger than $\Delta y/\beta$. At the same time, the seat 35 is tilted in a direction opposite to the direction of the movement to enhance the feeling of the movement. Then, the user can perceive the movement with respect to the image naturally.

It should be noted that also in the second embodiment, a magnification of the projection optical systems 4 and 6 is changed as in the first embodiment, and thus an amount of the movement $\Delta Y'$ of the LCDs 3 and 5 of $\Delta y/\beta$ is calculated each time $\beta$ is changed.

The back and forth movement of the user's head caused by the operation of the lever 36b is detected and the virtual image is moved in a direction opposite to a direction of the detected movement for the same time duration as a duration over which the seat 35 is moved. The virtual image can be moved back and forth by means of substantially the same mechanism as in the first embodiment.

Furthermore, the image is enlarged or reduced in accordance with a direction of the back and forth movement by means of the control circuit 38. At the same time, the LCDs 3 and 5 are moved by the driving devices 31 and 32 by a given distance which will be determined in the following manner.

A direction and an amount of the movement $\Delta X$ of a movement of LCDs 3 and 5 is determined such that the condition of $1/(L-\Delta X)-1/(L'-\Delta x)=1/f$ is substantially satisfied as has been explained above with reference to FIG. 6. If $\Delta X$ is positive, the LCDs 3 and 5 are moved toward the projection optical systems 4 and 6 by a calculated amount. If $\Delta X$ is negatives the LCDs 3 and 5 are moved away from the projection optical systems 4 and 6 by a calculated amount.

An amount of the forward movement $\Delta x$ derived from the operation of the lever 36b is a product of the moving speed of the seat and the time duration over which the lever is operated. In case of the backward movement, a sign is set to be negative. The image is reduced or enlarged in accordance with the calculated distance $\Delta X$ by about $(L'(L-\Delta X))/(L(L'-\Delta x))$ times. The reduction or enlargement is carried out about the center of the image displayed in the standard condition. In this manner, a change in the projecting magnification due to the movement of the LCDs 3 and 5 can be cancelled out or compensated for.

In the present embodiment, if the lever 36b is operated such that the user's head is moved forwardly from the standard position, the LCDs 3 and 5 are moved closer to the projection optical systems 4 and 6 and at the same time the image is enlarged about its center. The thus converted image signal as well as the control signal are supplied to the image display apparatus 2 by means of the conductor 39 (FIG. 9) and the enlarged images are displayed on the LCDs 3 and 5 which are moved by the driving devices 31 and 32 in a given direction by a given amount.

As explained above, when the user's head is moved back and forth, the LCDs 3 and 5 are moved such that the virtual image is moved in a direction opposite to that of the movement of the user's head by the same amount as that of the movement of the user's head, and thus the virtual image is perceived to be stationary within the space even if the user's head is moved back and forth to enhance the virtual reality.

Further, also in the present embodiment, the LCDs 3 and 5 are moved in a direction along which the LCDs are aligned so that the optical angle is increased in response to the movement of the LCDs toward the projection optical systems 4 and 6. An actual movement of the LCDs 3 and 5 is identical with that of the first embodiment, and loci of the center points of the LCDs 3 and 5 substantially coincide with segments connecting the middle points of segments connecting the principal points of the projection optical systems 4 and 6 on the side of the LCDs and the focal points of the projection optical systems 4 and 6. The movement of the LCDs 3 and 5 in the direction in which the LCDs are aligned is performed by the driving devices 31 and 32.

In this manner, when the user's head is moved forwardly and the LCDs 3 and 5 are moved toward the projection optical systems 4 and 6, the right and left images can be seen at the optical angle which is substantially corresponded with a position at which the virtual image is formed, and therefore the user can see the virtual image naturally.

In a modification of the second embodiment, the virtual image is moved over a distance which is larger than a distance over which the user's head is moved backwardly and forwardly. In this case, the user can feel that the user is moved over a distance larger than a distance over which the user's head is moved.

As explained above, in the present embodiment, even when the user's head is moved up and down, right and left, and back and forth, the virtual images are perceived to be stationary within the space, so the feeling of the virtual reality can be enhanced.

Figure 11:
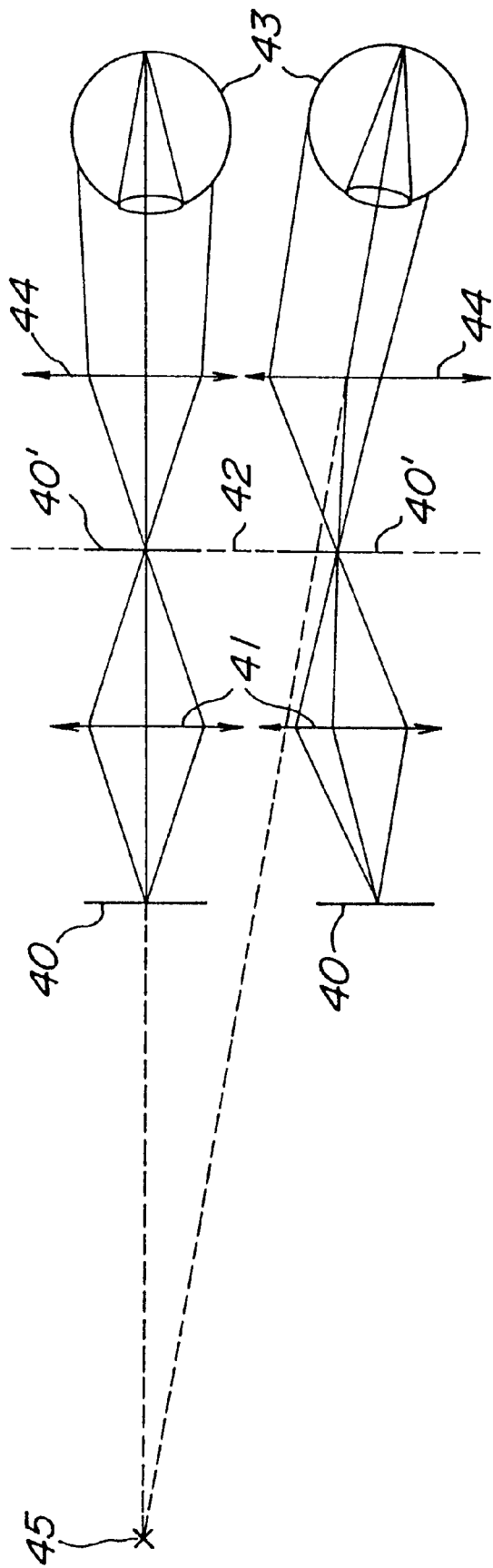
FIG. 11 is a schematic view showing an optical path of a third embodiment of the image display system according to the invention.

FIG. 11 is a schematic view showing an operation of a third embodiment of the head-mounted type image display system according to the invention. In the present embodiment, the image display devices are arranged to be stationary, and images formed on image planes which are conjugate with the image planes of the image display devices are moved in response to the up and down movement and the right and the left movement of the user's head. As shown in FIG. 11, along an optical axis are arranged a display plane 40, a relay lens 41, a conjugate plane 42 formed by the relay lens 41, a projection optical system 44 for projecting an image formed near the conjugate plane 42 onto an eye 43. It should be noted that in FIG. 11 other optical elements are not shown for the sake of simplicity.

An upper portion of FIG. 11 denotes a standard condition, in which the optical axis of relay lens 41 coincide with the optical axis of the projection optical system 44. In this case, if a reflection surface is provided within the optical path, it is necessary that the optical axis is straight. Then, the displayed image on the image plane 40 is formed by the relay lens 41 at a position 40' on the conjugate plane 42. A center of the displayed image is shifted at a point at which the conjugate plane 42 intersects with the optical axis of the projection optical system 44, and thus a center 45 of the virtual image is situated just in front of the user.

A lower portion of FIG. 11 denotes a condition in which the user moves up and down and right and left. In this case, the relay lens 41 is moved laterally, i.e. in a direction perpendicular to the optical axis, in an opposite direction to that in which the user's head is moved. Then, the displayed image on the display plane 40 is shifted on the conjugate plane 42, so that the center 45 of the virtual image is shifted from the front position with respect to the eye 43.

In order to perceive the stationary virtual image regardless of the shift of the center point 45 of the virtual image, a condition of $0.8<\Delta y/(\beta \cdot \Delta Y')<1.2$ has to be satisfied, wherein $\Delta Y'$ denotes an absolute value of a shift amount of the image on the conjugate plane 42, $\beta$ represents an absolute value of a magnification of the projection optical system 44 and $\Delta y$ shows an absolute value of a displacement of the user.

In order to satisfy the above mentioned condition, in the present embodiment an absolute value of an amount of the lateral shift $\Delta yR$ of the relay lens 41 with respect to the optical axis is smaller than $\Delta y/(0.8\beta(\beta R+l))$, but larger than $\Delta y/(1.2\beta(\beta R+l))$. Then, the virtual image remains substantially stationary within the space even though the user's head is moved up and down or right and left, so that the feeling of the virtual reality can be enhanced. It should be noted that in the present embodiment, the image display devices are arranged stationary, and therefore an electric wiring for the image display devices can be simplified.

Figure 12:
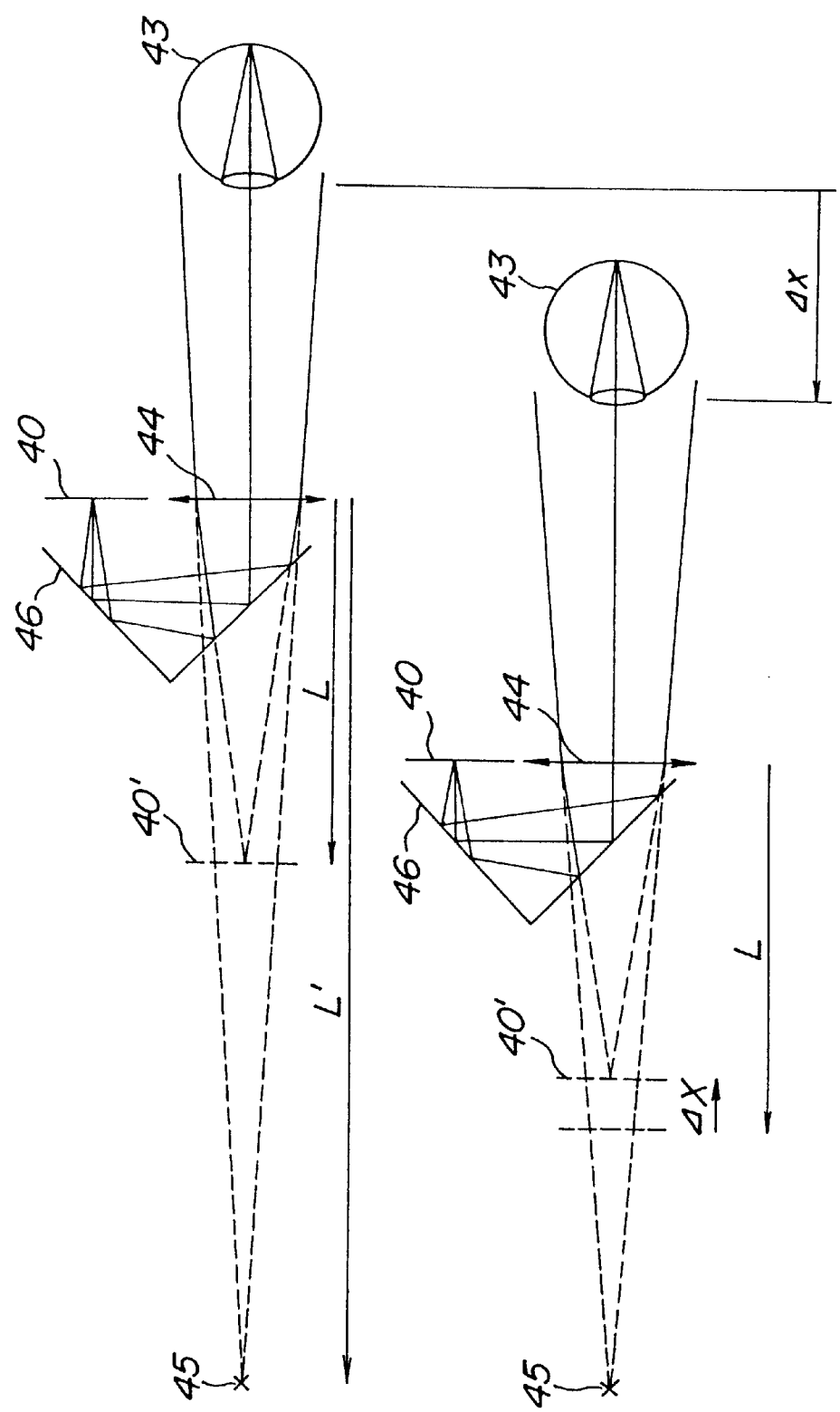
FIG. 12 is a schematic view representing an optical path of a fourth embodiment of the image display system according to the invention.

FIG. 12 is a schematic view showing the operation of a fourth embodiment of the head-mounted type image display system according to the invention. In the present embodiment, the movement of the virtual image in response to the back and forth movement of the user's head is performed by moving a pair of reflection mirrors which are arranged perpendicular to each other. As illustrated in FIG. 12, along an optical axis there are arranged a display plane 40, a pair of reflection mirrors 46, and a projection optical system 44 for projecting an image displayed on the display plane 40 onto an eye 43.

An upper portion of FIG. 12 denotes a standard condition, in which the displayed image on the image plane 40 is formed by the reflection mirrors 46 on a conjugate plane 40'. Then, the image on the conjugate plane 40' is projected on the eye 43 by means of the projection optical system 43. A center 45 of the virtual image is formed at such a position that the displayed image were actually formed on the conjugate plane 40'.

A lower portion of FIG. 11 denotes a condition in which the user moves back and forth. In this case, the reflection mirrors 46 are moved such that the following condition is satisfied:

$$L-f(L'-0.8\Delta x)/(f+L'-0.8\Delta x)<\Delta X<L-f(L'-1.2\Delta x)/(f+L'-1.2\Delta x)$$

wherein L is a distance between the conjugate plane 40' and the principal point of the projection optical system 44 on the side of the user in the standard condition, L' is a distance between the virtual image and the principal point of the projection optical system 44 on the side of the user, f is a focal length of the projection optical system 44, $\Delta x$ is an amount of the forward movement of the user's head, and $\Delta X$ is a distance over which the conjugate plane 40' is moved in a given direction. Then, the movement within the space of the virtual image can be made smaller.

It should be noted that L' is equal to Lf/(f−L). If $\Delta X$ is positive, the conjugate plane 40' is moved toward the projection optical system 44 by a calculated amounts and if $\Delta X$ is negative, the conjugate plane 40' is moved away from the projection optical system by a calculated amount. In order to cancel a variation in the projecting magnification due to the movement of the conjugate plane 40', the image is enlarged or reduced by a value within a range from $0.8(L'(L-\Delta x)/(L(L'-\Delta x))$ to $1.2(L'(L-\Delta x))/(L(L'-\Delta x))$.

In the present embodiment, the movement of the conjugate plane 40' is performed by moving the reflection mirrors 46. In this case, it is sufficient to move the reflection mirrors 46 by an amount which is a half of said desired amount $\Delta X$.

Also in the present embodiment, even if the user's head is moved back and forth, the virtual image is stationary, and thus the feeling of the virtual reality can be enhanced. Furthermore, since the image display devices are stationary, an electric wiring for the image display devices can be simplified.

FIG. 13 is a schematic view explaining the operation of a fifth embodiment of the head-mounted type image display system according to the invention. In the present embodiment, the optical angle due to the movement of the virtual image in response to the back and forth movement of the user's head is performed by moving reflection planes.

In the embodiments so far explained, the conversion of the optical angle is performed by moving the image display devices such that the centers of the LCDs are moved along the segment connecting the middle point of the segment connecting the principal points of the projection optical systems on the side of the user's eyes and the focal points of the projection optical systems. In the present embodiment, the image display devices are stationary, but reflection mirrors are moved such that the conjugate images of the respective image display devices are moved along the segments connecting the middle point of the segment connecting the principal points of the projection optical systems on the side of the user's eyes and the respective focal points of the projection optical systems.

At first, the image display device and optical systems for the right eye of the user will be explained. There are arranged fixed image display device 47, movable reflection mirror 48, projection optical system 49 and fixed reflection mirror 49 such that a right-eye image is projected onto the right eye 51 of the user. The movable mirror 48 is inclined by an angle $\theta$ with respect to the optical axis P of the projection optical system 49, said angle $\theta$ satisfying the following condition: $\tan \theta = I/(2f)$, wherein I is a distance between right and left exit pupil centers 51a and 51b and f is a focal length of the projection optical system 49. During the movement, the movable reflection mirror 48 is kept at said inclination angle, so that the mirror is subjected to a parallel movement.

The image display device 47 is arranged at a position which is determined in the following manner. Now a return point 53 is set at will on a portion of the optical axis P of the projection optical system 49, said portion extending from the principal point of the projection optical system on the side of the image display device toward the movable reflection mirror 48. Then, an axis Q extending from said return point 53 and being inclined by $2\theta$ with respect to the optical axis P is considered. The image display device 47 is arranged such that its center is situated on said axis Q, its image display plane is perpendicular to said axis Q, and a sum of lengths of two segments extending from the center of the image display device to the principal point of the projection optical system 49 on the side of the image display device via said return point 53 is equal to the focal length f of the projection optical system 49.

Left-eye image display device 54, movable reflection mirror 55, projection optical system 56 and fixed reflection mirror 57 for the left eye 52 of the user are arranged in the same manner as those for the right eye 51. When the movable reflection mirrors 48 and 55 are moved, conjugate images of the displayed images on the image display devices 47 and 54 are moved along segments connecting the principal points of the projection optical systems 49 and 56 on the side of the user's eyes 51 and 52 and respective focal points of the projection optical systems 49 and 56. Therefore, the virtual images of central portions of the image display devices 47 and 54 are formed on a straight line in front of the user passing through the pupil centers 51a and 52a of the eyes 51 and 52 as shown by converting optical paths bent by the movable reflection mirrors 48 and 55 into straight lines.

Therefore, when the movable reflection mirrors 48 and 55 are moved in a symmetrical manner in accordance with a back and forth movement of the user's head, the central portion of the virtual image is fixed within the space, so that the diopter and optical angle are satisfied and the user can feel the enhanced virtual reality. In FIG. 13, a reference numeral 58 denotes an image of the projection optical system 56 formed by the reflection mirror 57 and a reference numeral 59 represents an image of the image display device 54 formed by the reflection mirror 55.

When the user's head is moved forwardly by a distance $\Delta x$, the movable reflection mirrors 48 and 55 are moved toward the projection optical systems 49 and 56 by a distance $\Delta X = \{L - (f(L'-\Delta x))/(f+L'-\Delta x)\}/(1+\cos 2\theta)$, wherein L is a distance from the principal point of the projection optical system 49, 56 on the side of the image display device to the image display device 47, 54 via the movable reflection mirror 48, 55, and L' is a distance from the virtual image projected by the projection optical system 49, 56 to the principal point of the projection optical system on the side of the user (it should be noted the optical path bent by the fixed reflection mirror 50, 57 is converted into a straight line).

It should be noted that L' is equal to $Lf/(f-l)$. In FIG. 13, a lower portion illustrates the condition before the movement and an upper portion denotes the condition after the movement. Also in the present embodiment, when the image prior to the movement is reduced or enlarged about its center portion by $(L'(L-\Delta X))/(L(L'-\Delta x))$ times, it is possible to cancel a variation in magnification due to the movement of the image display devices.

In the present embodiment, the image display devices such as LCDs can be fixed in the head-mounted type image display apparatus, and thus it is possible to obtain a virtual image satisfying the diopter and optical angle without damaging the wiring to the image display devices.

The present invention is not limited to the embodiments so far explained, but many modifications and alternatives may be conceived by those skilled in the art within the scope of the invention. In the above explained embodiments, the optical systems are shown simply by deleting reflection mirrors as far as possible, but reflection mirrors may be provided in the optical paths as in the fifth embodiment illustrated in FIG. 13. Even when the optical system includes reflection mirrors, the optical paths in the claims appended hereto be interpreted to be converted into straight lines.

Furthermore, if an amount of the up and down or right and left or back and forth movement of the user's head is about 1 cm, the means for moving the head-mounted type image display apparatus in an opposite direction to that of the movement of the user's head by the same amount may be formed by a means for moving the virtual image.

As explained above in detail, according to the invention, the virtual image is always perceived by the user as remaining substantially stationary within the space even when the user's head is moved back and forth, and a variation in a size of the virtual image can be corrected. Therefore, the user can have a feeling that the user moves toward the virtual image or away from the virtual image.

Furthermore, the displayed image can be perceived to be fixed within the frame as in a usual display in which the image displayed within the frame is perceived to be separated from the viewer.

Moreover, even when the viewer's head is moved up and down or right and left, the virtual image can be perceived as remaining substantially stationary.

Even when the user moves closer to the image, it is possible to see the image by the right and left eyes without causing any unusual feeling.

What is claimed is:

1. A head-mounted type image display system comprising:

a head-mounted type image display apparatus and a mounting means for mounting said head-mounted type image display apparatus on a head of a user, said head-mounted type image display apparatus having first and second image display devices displaying first and second images, respectively, and first and second projection optical systems projecting said first and second images displayed on said first and second image display devices onto right and left retinas of a user as virtual images, respectively;

a back and forth movement detecting means for producing a displacement signal representing a direction and an amount of back and forth movement of a user's head; and a virtual image moving means for responding to said displacement signal to move the virtual images in an opposite direction to the direction of said movement of the user's head;

wherein said first and second projection optical systems are fixed to said head-mounted type image display apparatus such that positions of exit pupils of the projection optical systems are not changed, said virtual image moving means comprises an image display device moving means for moving the first and second image display devices toward the projection optical systems when the user's head is moved forwardly and for moving the first and second image display devices away from the projection optical systems when the user's head is moved backwardly, and an image enlarging and reducing means for enlarging the first and second images displayed on the first and second image display devices, respectively, when the user's head is moved forwardly and reducing the images displayed on the first and second image display devices, respectively, when the user's head is moved backwardly, when a distance between a display plane of said first and second image display devices and a principal point of the projection optical systems on the side of the image display devices in a standard condition is L, a distance between the virtual images and the principal point of the projection optical systems on the side of the user is L', a focal length of the projection optical systems is f and an amount of the forward movement of the user's head is $\Delta x$, said first and second image display devices are moved by an amount $\Delta X$ which satisfies the following condition:

$L-f(L'-0.8\Delta x)/(f+L'-0.8\Delta x) < \Delta X < L-f(L'-1.2\Delta x)/(f+L'-1.2\Delta x)$ and the images displayed on the first and second image display devices are enlarged or reduced by a value within a range from $0.8(L'(L-\Delta X)/L(L'-\Delta x))$ to $1.2(L'(L-\Delta X)/(L(L'-\Delta x)))$ so as to compensate for a variation in a projecting magnification due to the movement of the displayed images.

2. A head-mounted type image display system according to claim 1, wherein said virtual image moving means comprises driving means for laterally shifting eccentrically at least one of said first and second image display devices such that an angle between a first segment connecting a center of the first virtual image formed by the first projection optical system and a center of an exit pupil of the first projection optical system and a second segment connecting a center of the second virtual image formed by the second projection optical system and a center of an exit pupil of the second projection optical system is increased in response to the forward movement of the user's head and is decreased in response to the backward movement of the user's head.

3. A head-mounted type image display system according to claim 1, wherein said driving means moves at least one of the first and second image display devices eccentrically such that the first and second virtual images are seen by the user with an optical angle which substantially corresponds to a position at which the first and second virtual images are formed.

4. A head-mounted type image display system according to claim 3, wherein said driving means is constructed such that loci of center points of the first and second image display devices substantially coincide with segments connecting middle points of segments connecting the principal points of the projection optical systems on the side of the first and second image display devices and focal points of the projection optical systems.

5. A head-mounted type image display system comprising:

a head-mounted type image display apparatus and a mounting means for mounting said head-mounted type image display apparatus on a head of a user, said head-mounted type image display apparatus having first and second image display devices displaying first and second images, respectively, and first and second projection optical systems projecting said first and second images displayed on said first and second image display devices onto right and left retinas of a user as virtual images, respectively;

a back and forth movement detecting means for producing a displacement signal representing a direction and an amount of back and forth movement of a user's head; and a virtual image moving means for responding to said displacement signal to move the virtual images in an opposite direction to the direction of said movement of the user's head;

wherein said first and second image display devices are fixed relative to the head-mounted type image display apparatus, said projection optical systems are fixed relative to the head-mounted type image display apparatus such that positions of exit pupils of the projection optical systems are not changed, said virtual image moving means includes an optical system for moving conjugate images of the images displayed on said image display devices toward the projection optical systems when the user's head is moved forwardly and for moving the conjugate images of the images displayed on said image display devices away from the projection optical systems when the user's head is moved backwardly and an image enlarging and reducing means for enlarging the images displayed on the first and second image display devices when the user's head is moved forwardly and reducing the images displayed on the first and second image display devices when the user's head is moved backwardly, when a distance between a conjugate image plane of said first and second image display devices and a principal point of the projection optical systems on the side of the image display devices in a standard condition is L, a distance between the virtual images and the principal point of the projection optical systems on the side of the user is L', a focal length of the projection optical systems is f and an amount of the forward movement of the user's head is Δx, said conjugate image plane of said first and second image display devices are moved by an amount ΔX which satisfies the following condition:

L−f(L'−0.8Δx)/(f+L'−0.8Δx)<ΔX<L−f(L'−1.2Δx)/(f+L'−1.2Δx) and the images displayed on the first and second image display devices are enlarged or reduced by a value within a range from 0.8(L'(L−ΔX)/L(L'−Δx)) to 1.2(L'(L−ΔX)/(L(L'−Δx)) so as to compensate for a variation in a projecting magnification due to the movement of the displayed images.

6. A head-mounted type image display system according to claim 5, wherein, said virtual image moving means comprises optical means for laterally shifting at least one of said conjugate images such that an angle between a first segment connecting a center of the first virtual image formed by the first projection optical system and a center of an exit pupil of the first projection optical system and a second segment connecting a center of the second virtual image formed by the second projection optical system and a center of an exit pupil of the second projection optical system is increased in response to the forward movement of the user's head and is decreased in response to the backward movement of the user's head.

7. A head-mounted type image display system according to claim 6, wherein said optical means of the virtual image moving means comprises a reflection surface which is inclined with respect to an optical axis of the projection optical system and is subjected to a parallel movement so as to perform a conversion of an optical angle in response to the forward and backward movement of the virtual images.

8. A head-mounted type image display system according to claim 7, wherein said reflection surface is inclined with respect to the optical axis of the projection optical system by an angle θ which satisfies a condition of tan θ=I/(2f), where I is a distance between exit pupil centers of the projection optical systems and f is a focal length of the projection optical systems.

9. A head-mounted type image display system according to claim 5, wherein said optical system of the virtual image moving means includes a pair of reflection mirrors which are arranged perpendicular to each other and are moved together.

10. A head-mounted type image display system comprising:

a head-mounted type image display apparatus including a head-mounted type image display device and a mounting means for mounting said head-mounted type image display apparatus on a head of a user, said head-mounted type image display apparatus having first and second image display devices displaying first and second images, respectively, and first and second projection optical systems projecting said first and second images displayed on said first and second image display devices onto right and left retinas of a user as virtual images, respectively;

a movement detecting means for producing a displacement signal representing a direction and an amount Δy of up and down or right and left movement of a user's head;

a virtual image moving means for responding to said displacement signal to move the virtual images in a direction opposite to the direction of the movement of the user's head by an amount within a range from 0.8 Δy to 1.2 Δy;

an original signal generating means for generating an original image signal;

an image signal converting means connected to said movement detecting means and said original image signal generating means for converting said original image signal in accordance with said displacement signal to derive a converted image signal which can be displayed by said image display devices;

whereby said virtual image moving means is constructed to move the image display devices on image display planes of the image display devices such that a condition of 0.8<Δy/(β·ΔY')<1.2 is satisfied, wherein β is an absolute value of a lateral magnification of the projection optical systems and ΔY' is an absolute value of an amount of the movement of the first and second image display devices on the image planes thereof, wherein when the user's head is moved within a predetermined range, the image display devices are not moved, but when the user's head is moved beyond said predetermined range, the image display devices are moved in such a manner that the above mentioned condition of 0.8<Δy/(β·ΔY')<1.2 is satisfied.

11. A head-mounted type image display system according to claim 10, wherein said original image is a signal including a frame signal of a field of view, and said image signal converting means is constructed such that an image of the frame is enlarged or reduced in accordance with the movement of the user's head.

12. A head-mounted type image display system comprising:

a head-mounted type image display apparatus including a head-mounted type image display device and a mounting means for mounting said head-mounted type image display apparatus on a head of a user, said head-mounted type image display apparatus having first and second image display devices displaying first and second images, respectively, and first and second projection optical systems projecting said first and second images displayed on said first and second image display devices onto right and left retinas of a user as virtual images, respectively;

a movement detecting means for producing a displacement signal representing a direction and an amount Δy of up and down or right and left movement of a user's head;

a virtual image moving means for responding to said displacement signal to move the virtual images in a direction opposite to the direction of the movement of the user's head by an amount within a range from 0.8 Δy to 1.2 Δy;

an original signal generating means for generating an original image signal;

an image signal converting means connected to said movement detecting means and said original image signal generating means for converting said original image signal in accordance with said displacement signal to derive a converted image signal which can be displayed by said image display devices;

whereby said virtual image moving means is constructed such that upon supplying said converted image signal from said image signal converting means to the image display devices, a condition of $0.8<\Delta y/(\beta \cdot \Delta Y)<1.2$ is satisfied, wherein $\beta$ is an absolute value of a lateral magnification of the projection optical systems and $\Delta Y$ is an absolute value of an amount of the movement of the first and second images on he first and second image display devices, respectively, wherein when the user's head is moved within a predetermined range, the virtual images are not moved, but when the user's head is moved beyond said predetermined range, the images are moved on the image display devices in such a manner that the above mentioned condition of $0.8<\Delta y/(\beta \cdot \Delta Y)<1.2$ is satisfied.

13. A head-mounted type image display system according to claim 12, wherein said original image signal is a signal including a frame signal of a field of view, and said image signal converting means is constructed such that an image of the frame is enlarged or reduced in accordance with the movement of the user's head.

14. A head-mounted type image display system comprising:

a head-mounted type image display apparatus including a head-mounted type image display device and a mounting means for mounting said head-mounted type image display apparatus on a head of a user, said head-mounted type image display apparatus having first and second image display devices displaying first and second images, respectively, and first and second projection optical systems projecting said first and second images displayed on said first and second image display devices onto right and left retinas of a user as virtual images, respectively;

a movement detecting means for producing a displacement signal representing a direction and an amount $\Delta y$ of up and down or right and left movement of a user's head;

a virtual image moving means for responding to said displacement signal to move the virtual images in a direction opposite to the direction of the movement of the user's head by an amount within a range from 0.8 $\Delta y$ to 1.2 $\Delta y$;

an original signal generating means for generating an original image signal;

an image signal converting means connected to said movement detecting means and said original image signal generating means for converting said original image signal in accordance with said displacement signal to derive a converted image signal which can be displayed by said image display devices;

whereby said first and second image display devices are fixed to a housing of the head-mounted type image display device, and said virtual image moving means comprises optical means for moving conjugate images formed on conjugate planes of the image display planes of the first and second image display devices, respectively, on said conjugate images, said optical means being constructed to move said conjugate images on said respective conjugate planes such that a condition of $0.8<\Delta y/(\beta \cdot \Delta Y')<1.2$ is satisfied, wherein $\beta$ is an absolute value of a lateral magnification of the projection optical systems and $\Delta Y'$ is an absolute value of an amount of the movement of said conjugate images on said respective conjugate planes, wherein when the user's head is moved within a predetermined range, the image display devices are not moved, but when the user's head is moved beyond said predetermined range, the image display devices are moved in such a manner that the above mentioned condition of $0.8<\Delta y/(\beta \cdot \Delta Y')<1.2$ is satisfied.

15. A head-mounted type image display system comprising:

a head-mounted type image display apparatus and a mounting means for mounting said head-mounted image display apparatus on a head of a user, said head-mounted type image display apparatus having first and second image display devices displaying first and second images, respectively, and first and second projection optical systems projecting said first and second images displayed on said first and second image display devices onto right and left retinas of a user as virtual images, respectively;

a movement detecting means for producing a displacement signal representing a direction and an amount $\Delta y$ of one of an up and down movement or a right and left movement of a user's head;

virtual image moving means for responding to said displacement signal to move the virtual images in an opposite direction to the direction of the movement of the user's head;

an original image signal generating means for generating an original image signal;

an image signal converting means connected to said movement detecting means and said original image signal generating means for converting said original image signal in accordance with said displacement signal to derive a converted image signal which can be displayed by said image display devices;

wherein said first and second image display devices are fixed relative to the head-mounted type image display apparatus, said virtual image moving means comprises an optical means for moving conjugate images formed on conjugate planes of image display planes of the first and second image display devices, said optical means moving said conjugate images on said respective conjugate planes such that a condition of $0.8<\Delta y/(\beta \cdot \Delta Y')<1.2$ is satisfied, wherein $\beta$ is an absolute value of a lateral magnification of the projection optical systems and $\Delta Y'$ is an absolute value of an amount of the movement of said conjugate images on said respective conjugate planes, and said optical means for moving the conjugate images comprises relay lenses arranged between the image display devices and the conjugate planes movably in a direction perpendicular to optical axis.

* * * * *